United States Patent [19]

Nelson et al.

[11] Patent Number: 5,273,558
[45] Date of Patent: Dec. 28, 1993

[54] ABRASIVE COMPOSITION AND ARTICLES INCORPORATING SAME

[75] Inventors: Leonard E. Nelson, Lake Elmo; Loc X. Van, Minneapolis, both of Minn.

[73] Assignee: Minnesota Mining and Manufacturing Company, St. Paul, Minn.

[21] Appl. No.: 907,223

[22] Filed: Jul. 1, 1992

Related U.S. Application Data

[63] Continuation-in-part of Ser. No. 753,205, Aug. 30, 1991, abandoned.

[51] Int. Cl.$^5$ ............................................. C09K 3/14
[52] U.S. Cl. ........................................ 51/298; 51/293; 51/308; 51/309; 433/166
[58] Field of Search .................. 51/293, 298, 308, 309; 433/166

[56] References Cited

U.S. PATENT DOCUMENTS

| | | | |
|---|---|---|---|
| 2,885,276 | 5/1959 | Upton, Jr. | |
| 2,972,527 | 2/1961 | Upton, Jr. | 51/298 |
| 3,562,968 | 3/1969 | Johnson et al. | 51/389 |
| 3,781,172 | 12/1973 | Pett et al. | 51/309 |
| 3,850,589 | 11/1974 | Charvat | 51/296 |
| 3,891,408 | 6/1975 | Rowse et al. | 51/295 |
| 3,893,826 | 7/1975 | Quinan et al. | 51/295 |
| 3,960,516 | 6/1976 | Bairdi | 51/293 |
| 3,982,359 | 9/1976 | Elbel et al. | 51/295 |
| 4,049,369 | 9/1977 | Shaffer | 431/95 |
| 4,088,729 | 5/1978 | Sherman | 264/259 |
| 4,128,972 | 12/1978 | Chervat | 51/298 |
| 4,150,955 | 4/1979 | Samuelson | 51/298 |
| 4,221,572 | 9/1980 | Torimae et al. | 51/298 |
| 4,314,827 | 2/1982 | Leitheiser et al. | 51/298 |
| 4,328,322 | 5/1982 | Baron | 521/163 |
| 4,459,779 | 7/1984 | Shen | 51/296 |
| 4,505,720 | 3/1985 | Gabor et al. | 51/295 |
| 4,518,397 | 5/1985 | Leitheiser et al. | 51/293 |
| 4,554,765 | 11/1985 | Grimes | 51/401 |
| 4,574,003 | 3/1986 | Gerk | 51/309 |
| 4,613,345 | 9/1986 | Thicke et al. | 51/293 |
| 4,623,364 | 11/1986 | Cottringer et al. | 51/309 |
| 4,652,275 | 3/1987 | Bloecher et al. | 51/298 |
| 4,744,802 | 5/1988 | Schwabel | 52/309 |
| 4,774,788 | 10/1988 | Shacham et al. | 51/168 |
| 4,786,657 | 11/1988 | Hammar et al. | 522/90 |
| 4,799,939 | 1/1989 | Bloecher et al. | 51/293 |
| 4,933,373 | 6/1990 | Moren et al. | 521/99 |
| 5,011,512 | 4/1991 | Wald et al. | 51/295 |

FOREIGN PATENT DOCUMENTS

| | | |
|---|---|---|
| 228856 | 7/1987 | European Pat. Off. . |
| 3416186 | 1/1985 | Fed. Rep. of Germany . |
| 1245373 | 9/1971 | United Kingdom . |
| 1549685 | 8/1979 | United Kingdom . |

OTHER PUBLICATIONS

*Thermoplastic Elastomers, A Comprehensive Review*, Edited by N. R. Legge, G. Holden and H. E. Schroeder, Hansen Publishers, NY 1987, pp. 14–23 and 216–229.

*Primary Examiner*—Mark L. Bell
*Assistant Examiner*—Willie J. Thompson
*Attorney, Agent, or Firm*—Gary L. Griswold; Walter N. Kirn; Jeffrey L. Wendt

[57] ABSTRACT

Bonded abrasive compositions, articles incorporating same, and methods of making the compositions and articles are presented, the compositions comprising abrasive particles dispersed throughout and adhered within an elastomeric polyurea matrix. The polyurea matrix is formed from the polymerization reaction product of a polyfunctional amine and an isocyanate. The compositions exhibit excellent smear- and wear-resistance, and may be attached to a variety of backings. One preferred backing is integrally molded to the bonded abrasive composition.

22 Claims, 2 Drawing Sheets

ABRASIVE COMPOSITION AND ARTICLES INCORPORATING SAME

CROSS-REFERENCE TO RELATED APPLICATIONS

This application is a continuation in part of parent application Ser. No. 07/753,205, filed Aug. 30, 1991, (abandoned), and is related to assignee's copending U.S. application Ser. No. 07/811,547, filed Dec. 20, 1991.

BACKGROUND OF THE INVENTION

1. Field of the Invention

This invention relates to bonded abrasive compositions and articles made therefrom, the compositions containing abrasive particles dispersed throughout a smear-resistant and wear-resistant polyurea binder matrix, and to methods of making the compositions and articles.

2. Description of Related Art

Abrasive products comprising a solid or foamed organic polymeric matrix having abrasive granules dispersed throughout and bonded therein are well known and widely used. Typically, the polymeric matrix is composed of either a hard, thermoset resin, such as a catalyzed phenol-formaldehyde, or resilient elastomer, such as a polyurethane or a vulcanized rubber.

Bonded abrasives are to be distinguished from coated abrasives in their construction and mode of operation. Bonded abrasives (e.g., grinding wheels) are three-dimensional structures of binder and abrasive grains which rely upon the continual breakdown and removal of the abrasive grains on the cutting surface to continually present sharp cutting points to the material being ground. Coated abrasives, on the other hand, typically have only a single layer of abrasive grains. See, for example, U.S. Pat. No. 5,011,512, incorporated herein by reference.

When elastomeric binder matrices are used in bonded abrasives they generally produce an abrasive article having some degree of flexibility and resiliency. These abrasive articles typically provide a smoother abrasive action and a finer surface finish than that provided by a bonded abrasive article made with hard, thermoset resin. As a result of this, elastomeric bonded abrasive articles have found a wide range of industrial applications, such as deburring, finishing, and sanding in the metal and wood-working industries. However, often these elastomeric bonded abrasive articles have shown premature loss of abrasive particles and, in some cases, undesirable smearing or transfer of portions of the elastomeric binder to the surface of the workpiece.

Conventional flexible bonded abrasive articles typically employ an elastomeric polyurethane as the binder matrix. The polyurethane binder matrix may be a foam, as disclosed in U.S. Pat. Nos. 4,613,345, 4,459,779, 2,972,527, 3,850,589; UK Patent Specification No. 1,245,373 (published Sep. 8, 1971); or the polyurethane binder may be a solid, as disclosed in U.S. Pat. Nos. 3,982,359, 4,049,396, 4,221,572, and 4,933,373.

While synthetic polymers comprising the reaction product of polyisocyanates and oligomeric aminobenzoic acid esters and amines and processes for their preparation are known, they have not been suggested for use as a binder for bonded abrasive articles. U.S. Pat. No. 4,328,322 describes such polymers and processes. The same is true for the polyurethanes and polyurethane/ureas crosslinked with 2-glyceryl acrylate or 2-glyceryl methacrylate which are disclosed in U.S. Pat. No. 4,786,657. This reference describes the use of high equivalent weight diols and diamines, 2-glyceryl acrylate, diisocyanates, and low equivalent weight glycols and diamines in the production of polyurethanes and polyurethane/ureas. (See also Thermoplastic Elastomers, A Comprehensive Review, edited by N. R. Legge, G. Holden and H. E. Schroeder, Hanser Publishers, New York, 1987, P. 13-46.)

A preferred embodiment of this invention relates to an abrasive disc having a molded, integral, toughened, reinforced thermoplastic backing. Background art relating to integral molded backings include:

British Patent No. 1,549,685 describes a method of making a boreless porous grindstone with a plastic holder by compression or injection molding and relates to vitrified bonded abrasive articles;

U.S. Pat. No. 3,960,516 (Biardi) describes a process for making a grindstone with a plastic support formed by a molding process and also relates to vitrified bonded abrasive articles;

German Patent 3,416,186 describes an elastic support disc onto which synthetic resin containing abrasive minerals are coated;

U.S. Pat. No. 4,088,729 (Sherman) discloses a method of molding a thermoplastic hub onto a thermoset plastic abrasive disc;

U.S. Pat. No. 4,774,788 (Shacham et al.) discloses a method of molding a thermoplastic mounting hub having flanges directly onto a grinding wheel;

U.S. Pat. No. 4,554,765 (Grimes) describes a coated abrasive grinding disc, comprising a thermoplastic material bonded to abrasive material with a thermosetting resin, the disc having an integral mounting provision; and Assignee's co-pending U.S. patent application Ser. No. 07/811,547 (Stout, et al.) describes a coated abrasive backing comprising a reinforced, toughened thermoplastic backing coated with a thermosetting binder and abrasive grains.

While assignee's U.S. Pat. No. 4,933,373 discloses abrasive products which include an improved elastomeric binder which have commercially acceptable utility in many applications, in certain applications they have been found to be deficient in adequately retaining abrasive particles and to have insufficient wear efficiencies. Thus, an unmet need exists for a smear-resistant bonded abrasive article that has improved retention of abrasive particles and high wear efficiency in many applications, and which can be economically and safely fitted onto a tough backing.

SUMMARY OF THE INVENTION

The present invention provides smear-resistant, wear resistant bonded abrasive compositions, and articles incorporating same, which, when urged against a workpiece, operate smoothly without chatter, produce an acceptable surface finish at effective rates with improved retention of abrasive particles, and which may be attached to a wide range of backings.

Generally, the compositions may be described as the combination of:

(a) a cured smear-resistant and wear-resistant elastomeric polyurea binder matrix having urea linkages, the binder matrix selected from the group consisting of 1) the reaction product of a first polyfunctional amine having an average functionality of about 2 and an equivalent weight of at least about 300, said first polyfunctional amine being capable on polymerization of forming a first soft segment, and a polyfunctional isocyanate having an average isocyanate functionality of at least about 2 and an equivalent weight of less than about 300, said polyfunctional isocyanate being capable on polymerization of forming a first hard segment; and 2) the reaction product of a polyfunctional isocyanate prepolymer having a functionality of at least about 2 and having an equivalent weight of at least about 300, said polyfunctional isocyanate prepolymer being capable on polymerization of forming a second soft segment, and a second polyfunctional amine having an average functionality of at least about 2 and an equivalent weight of less than about 300, said second polyfunctional amine being capable on polymerization of forming a second hard segment; and (b) an effective amount of abrasive particles dispersed throughout said binder matrix.

The compositions of the invention may include chain extenders which include polyfunctional active hydrogen substituents which result in up to about 20 percent (more preferably only up to about 5 percent) of the total number of urea linkages being replaced with urethane linkages. The preferred compositions, however, are those having substantially 100 percent urea linkages.

Conventional abrasive particles can be employed in the abrasive compositions of the invention. The abrasive particles in the abrasive articles of the present invention may be contained therein as agglomerates, i.e., collections of abrasive particles bonded together with a similar or different bond system than that which hold the agglomerates in the abrasive article. Preformed agglomerates of abrasive particles are especially useful because the resultant abrasive articles, when fabricated into wheels, have high rates of abrasion, yet produce a smooth surface finish, have very low wheel-weight loss and have lower wear or wheel weight loss during use as compared to similar wheels employing individual conventional abrasive particles. When employing individual conventional abrasive particles, voids in the article are acceptable, but should be small in number and size. Abrasive wheels made according to the invention are useful on metal, glass, ceramics, composites and wood for abrasion and finishing operations.

Abrasive compositions of the invention employing preformed agglomerates preferably contain voids between the preformed abrasive agglomerates bonded together with the polyurea polymer. In some preferred embodiments the amount of polyurea polymer is adjusted to be just sufficient to give integrity to the resulting abrasive article, but not so much so as to fill the voids between the preformed agglomerates.

A preferred class of abrasive articles in accordance with the invention have the abrasive composition of the invention attached to a two or three dimensional backing. Preferred materials used as backings include rigid metal, rigid and flexible polymeric materials, composites, and fabrics.

One particularly preferred class of abrasive articles of the invention are those wherein a tough, heat resistant, fiber reinforced thermoplastic backing is integrally molded directly onto and partially into the voids of a disc of the abrasive composition of the invention. This structure is preferably produced by injection molding a molten thermoplastic polymer containing reinforcing fibers onto a major surface of the abrasive composition of the invention.

The invention also provides methods of making the bonded abrasive compositions and articles of the invention. The abrasive compositions of the invention are preferably prepared by the following steps:

a) combining the reaction precursors of a smear-resistant elastomeric polyurea binder matrix (the matrix as above described) with abrasive particles to form a curable abrasive mixture, and b) curing the mixture to form a bonded abrasive composition.

One preferred method includes placing the mixture of step (a) into a suitable mold cavity and curing the mixture in the cavity. The cured composition can be used "as is" as a grinding wheel, or attached to a suitable backing, preferably by utilizing the injection molding technique above described.

The bonded abrasive compositions and articles of the invention exhibit excellent abrasion and mechanical properties as evidenced by the Examples and disclosure provided hereinbelow. The abrasive compositions of the invention, especially when fabricated into wheels and discs (with or without a backing), display high rates of cut and significantly lower rates of abrasive wheel loss vis-a-vis conventional elastomer bonded abrasive wheels.

DESCRIPTION OF PREFERRED EMBODIMENTS

Definitions

Figure 1:
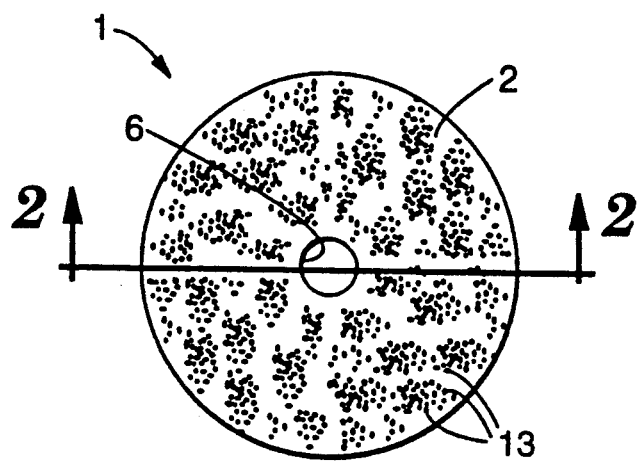
FIG. 1 is a plan (front) view of a bonded abrasive article in accordance with the invention.

As used herein, "soft segment" means a soft, flexible polymeric segment of the polyurea or polyurethane/urea which results from the polymerization of a polyfunctional amine having functionality of at least 2 and an equivalent weight of at least about 300, or a polyfunctional isocyanate prepolymer having functionality of at least 2 and an equivalent weight of at least about 300.

The term "hard segment" means a harder, less flexible polymer segment which results from polymerization of (a) polyfunctional isocyanate or polyfunctional amine having a functionality of at least about 2 and equivalent weight of less than about 300, and (b) optional chain extender.

"Isocyanate prepolymer" means an isocyanate functional macropolyol or other macromer with functionality capable of forming an isocyanate-terminated molecule.

"Chain extender" means low molecular weight monomers having active hydrogen functionality, where "active hydrogen functionality" is used in its conventional sense to refer to the reactive hydroxy, amine, carboxyl and/or thiol groups present in the molecule. The individual soft segments associate to form soft regions in the binder while individual hard segments associate to form hard regions in the binder.

As used herein, the term "percent abrasive article wear" means the weight loss of an abrasive article or composition during a given time while abrading a workpiece divided by the original weight of the abrasive article, multiplied by 100 to give a percent abrasive article wear; the term "efficiency" as that term relates to wear-resistance of the abrasive articles means the cut or weight loss of the workpiece being abraded divided by the percent abrasive article wear.

The following terms describe backing materials useful in making articles with the compositions described herein applied to the backing:

"Rigid metal" means a ferrous or nonferrous alloy which, when fabricated for use as a backing material, exhibits sufficient stiffness so that when in use, there is virtually no deflection or distortion of its original shape. Examples include aluminum and alloys containing aluminum, and various steel compositions;

"Rigid polymer" means a thermoplastic or thermosetting polymer which, when fabricated for use as a backing material, exhibits sufficient stiffness so that when in use, there is substantially no deflection or distortion of its original shape. The stiffness may be imparted, for example, by adjusting the backing thickness for a given polymer selection or by the addition of reinforcing agents. Examples include nylon 6, nylon 6,6, polypropylene, filled polypropylene, polyesters, filled epoxy resins, resole phenolic resins, novolac phenolic resins, polyetherimides, polyphenylene sulfide, and others;

"Flexible polymer" means a thermoplastic or thermosetting polymer which, when fabricated for use as a backing material, exhibits substantial conformability to the surface of the workpiece. Examples include natural and synthetic rubbers, thermoplastic elastomers, polyurethanes, polyester elastomers, olefinic elastomers, and thinner backings of polymers normally considered to be rigid;

"Composite" means a fiber- or fabric-reinforced polymeric material comprising 1) a fiber and/or fabric component, and 2) a thermoplastic or thermosetting polymeric matrix. Such materials used as backings for this invention may be rigid or flexible. Examples include cotton fabric-reinforced phenolic materials and glass fiber reinforced polyester materials, such as disclosed in assignee's copending application Ser. No. 07/811,547, (Stout et al.), docket number 47108USA1A, filed Dec. 20, 1991, incorporated by reference herein;

"Fabric" means a textile material made from fibers and/or yarns by weaving or knitting, or by nonwoven fabric forming techniques such as stitchbonding, air-laying, carding, spun bonding, melt blowing, wet-laying, or other known fabric-forming techniques;

The term "integrally molded", when used to describe an abrasive article having the abrasive composition of the invention attached to a composite backing, means that a portion of the composite backing enters and is cured within some of the voids of the abrasive composition. The term is not limited to any particular method of molding, although injection molding is considered the best mode; and The term "smear resistant" is meant to denote substantially no visible signs of the abrasive composition remaining on the workpiece after the workpiece has been finished, and means that the abrasive composition can be urged against a workpiece at high operating speeds and/or pressures without smearing or glazing of the composition onto the workpiece.

Bonded Abrasive Compositions

The bonded abrasive compositions of the invention are formed of abrasive particles dispersed throughout a smear-resistant polyurea binder matrix so as not to smear the binder matrix over the surfaces being abraded as the binder matrix gradually degrades under mechanical friction.

Suitable binder matrices for use in the bonded abrasive compositions of the present invention are comprised of soft and hard regions as described, supra. These polyurea polymer binders are particularly well suited in that the resultant abrasive articles have sufficient integrity and abrasive agglomerate retention (high efficiency) even at low binder matrix content, and are substantially smear-resistant. If the soft segments result from the polymerization of a polyfunctional amine, the hard segments result from polymerization of polyfunctional isocyanate. If soft segments result from polymerization of a polyfunctional isocyanate prepolymer, the hard segments result from polymerization of a polyfunctional amine. In either case, essentially equal equivalents of polyfunctional amines and polyfunctional isocyanates are employed.

Polyurea polymers especially well suited in the practice of this invention are made from polyfunctional amines which are oligomeric aromatic polyamines selected from the group consisting of:

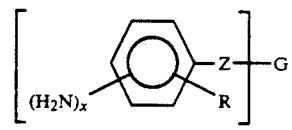

wherein n is an integer ranging from about 2 to about 4; each x is 1 or 2; each phenyl nucleus is para-amino, meta-amino, or dimeta-amino substituted; each Z is

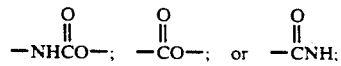

each R is hydrogen or lower alkyl having about 4 carbon atoms or less; and G is an n-valent radical which may be obtained by the removal of hydroxyl or amino groups, respectively, from an n-valent polyol or polyamine having an equivalent weight ranging from about 300 to about 3000. Below an equivalent weight of about 300, it will be difficult to achieve the desired flexibility in the cured binder. On the other hand, an equivalent weight above about 3000 may produce an oligomeric aromatic polyamine which is a solid, and thus harder to dispense into molds. Another suitable polyfunctional amine is bis(3-amino propyl) polytetrahydrofuran.

Preparation of oligomeric aromatic polyamines useful in the invention is described in detail in U.S. Pat. No. 4,328,322, incorporated herein by reference. Preferably, the oligomeric aromatic polyamines have an equivalent weight of at least about 300, and more preferably at least about 400. Examples of suitable oligomeric aromatic polyamines include those commercially available from Air Products and Chemicals, Inc. under the trade names POLAMINE 650, POLAMINE 1000, POLAMINE 1000G, POLAMINE 2000 and POLAMINE 2900. The numbering of the different oligomeric aromatic polyamines designated as POLAMINES indicates the approximate molecular weight, with one half of the number indicating the approximate equivalent weight. In certain applications the compositions can be formulated with less abrasive; for example, less abrasive can be used with the higher molecular weight polyamines than with the lower molecular weight versions (see Example 5).

The oligomeric aromatic polyamines are of two classes: aminobenzoic acid esters or amides where Z is

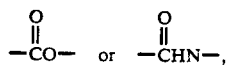

and aminophenyl urethanes where Z is

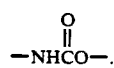

Preferably, the oligomeric aromatic polyamine is a substantially difunctional amino benzoic acid-terminated oligomer with a poly(tri-, tetra-, penta-, or hexa-)methylene ether backbone, having an equivalent weight ranging from about 300 to about 3000, or combinations thereof. Polytetramethylene ether backbone compositions are particularly preferable.

When employing oligomeric aromatic polyamines as the soft segment, the hard segments are preferably polyfunctional isocyanates having an average functionality ranging from about 2.0 to about 4.0. The polyfunctional isocyanates may be aliphatic, cycloaliphatic, arylaliphatic, aromatic, heterocyclic or mixtures thereof. The polyfunctional isocyanates preferably are aromatic or aliphatic polyisocyanates having an average functionality of at least about 2.0 and more preferably are aromatic polyisocyanates with a functionality ranging from about 2.0 to about −4.0, more preferably from about 2.0 to about 2.5. The polyfunctional isocyanate should be present in an amount sufficient to react with substantially all of the active hydrogen atoms in the polymerizable mixture. The ratio of the active hydrogen atoms of the polyfunctional amines to isocyanate groups of the polyisocyanate should range from about 0.80 to about 1.1, more preferably from about 0.9 to about 1.1.

Exemplary polyfunctional isocyanates meeting the above requirements of hard segments when polymerized include the polyisocyanate terminated reaction product of poly(tetramethylene glycol) polymer and an aromatic or aliphatic isocyanate having a functionality of at least about 2, or the reaction product of a dihydroxy terminated polyester such as poly(hexamethylene adipate) and an aromatic or aliphatic isocyanate having a functionality of at least about 2. Particularly preferable polyfunctional isocyanates include 1,6-hexamethylene diisocyanate, 1,4-cylcohexane diisocyanate, toluene diisocyanate, p-phenyl diisocyanate, diphenylmethane diisocyanate, naphthalene-1,5-diisocyanate, polymeric isocyanates, and mixtures thereof.

Alternatively, soft segments may be made from polymerized polyfunctional isocyanate prepolymers, and examples of suitable polyfunctional isocyanate prepolymers useful as soft segments when polymerized include the polyisocyanate terminated reaction product of poly(tetramethylene glycol) polymer and an aromatic or aliphatic isocyanate having a functionality of at least about 2, more preferably ranging from about 2 to about 5, or the polyisocyanate terminated reaction product of a dihydroxy terminated polyester such as poly(hexamethylene adipate) and an aromatic or aliphatic isocyanate having a functionality of at least about 2, more preferably ranging from about 2 to about 5. Preferably, the polyisocyanate terminated reaction product is blocked with blocking agents that react with the isocyanate groups, a reaction that is reversible at elevated temperatures to free the isocyanate groups which then can react with the polyfunctional amine. Examples of commercially available polyfunctional blocked isocyanate prepolymers include ADIPRENE BL-90, ADIPRENE BL-16 and ADIPRENE BL-315, from Uniroyal Chemical Co., Inc. Preferably abrasive articles of the invention are porous when employing blocked polyfunctional isocyanates so as to facilitate volatilization of the blocking agent.

When the soft segments are made from polymerized polyfunctional isocyanate prepolymers as just described, the hard segments are comprised of the polymerization of polyfunctional amines. Suitable polyfunctional amines functioning as hard segments when polymerized include aromatic, alkyl-aromatic, or alkyl polyfunctional amines, preferably primary amines; examples include methylene dianiline (MDA), polymeric methylene dianilines having a functionality preferably ranging from about 2.1 to about 4.0 which include the dianiline CURITHANE 103, commercially available from the Dow Chemical Company, and the dianiline MDA-85, from Bayer corporation. The dianiline CURITHANE 103 has an average amine functionality of about 2.3 and is composed of 65% 4,41-methylene dianiline, 5% 2,41-methylene dianiline, and 30% polymeric methylene dianiline. The dianiline MDA-85 contains about 85% 4,4,1-methylene dianiline and 15% polymeric methylene dianiline and amine functionality of about 2.2. Examples of suitable alkyl amines include 1,5-diamine-2-methyl pentane, and tris(2-aminoethyl) amine.

Where the polyurea binder matrices are made from oligomeric aromatic polyamine soft segments and polyfunctional isocyanate hard segments, the polyurea polymers may contain chain extenders. Chain extenders preferably have an active hydrogen functionality from about 2 to 8, preferably from about 2 to 4, and more preferably from about 2 to 3, and an equivalent weight less than about 300, preferably less than about 200. Well suited chain extenders are low molecular weight polyfunctional amines including aromatic, alkyl-aromatic, or alkyl polyfunctional amines, preferably primary amines. Examples of low molecular weight polyfunctional aromatic amines include methylene dianiline ("MDA"), polymeric methylene dianilines having a functionality of 2.1 to 4.0 which include the dianiline CURITHANE 103, commercially available from Dow Chemical Company, and the dianiline MDA-85, from Bayer Corporation. The dianiline CURITHANE 103 has an average amine functionality of about 2.3 and is composed of 65% 4,4'-methylene dianiline, 5% 2,41-methylene dianiline, and 30% polymeric methylene dianiline. The dianiline MDA-85 contains about 85% 4,4'-methylene dianiline and 15% polymeric methylene dianiline and amine functionality of about 2.2.

Examples of other suitable amine chain extenders include ethylene diamine, 1,5-diamine-2-methyl pentane, and tris(2-aminoethyl) amine. Other suitable chain extenders include trimethylolpropane monoalkyl ether, ethanolamine, diethanolamine, methylene dianiline, diethyl toluene diamine, 2-methylpentamethylenediamine, para-phenylene diamine, ethylene glycol, propylene glycol (1,2 and 1,3), butylene glycol (1,4 and 2,3), 1,4 butenediol, 1,4 butanediol, various hydroxy substitutions of pentanediol, hexanediol and octanediol, trimethylolpropane, and mixtures thereof.

A dessicant may be added to the mixture of polyfunctional amine and polyfunctional isocyanate for the purposes of drying the mixture. In particular, certain commercially available molecular seives have been used for these purposes. These molecular seives are typically and preferably alkali metal alumino-silicates, such as $K_{12}[(AlO_2)_{12}(SiO)_{12}]\cdot xH_2O$, which is commercially from UOP Molecular Seive Absorbents Co. It is also theorized that these molecular seives, when used in conjunction with certain silane coupling agents, act to catalyze the reaction between the polyfunctional amine and polyfunctional isocyanate.

The abrasive particles used to produce the abrasive articles of the invention may be individual particles, agglomerates of individual particles, or a mixture thereof (up to about 50 weight percent individual abrasive particles). The abrasive particles may be of any known abrasive material commonly used in the abrasive art. Examples of suitable abrasive particles include silicon carbide (including refractory coated silicon carbide such as disclosed in U.S. Pat. No. 4,505,720), aluminum oxide, alumina zirconia (including fused alumina zirconia such as disclosed in U.S. Pat. Nos. 3,781,172, 3,891,408, and 3,893,826, commercially available from the Norton Company of Worcester, Mass., under the trade designation NorZon), cubic boron nitride, garnet, pumice, sand, emery, mica, corundum, quartz, diamond, boron carbide, fused alumina, sintered alumina, alpha alumina-based ceramic material (available from Minnesota mining and Manufacturing Company under the trade designation CUBITRON), as disclosed in U.S. Pat. Nos. 4,314,827, 4,518,397, 4,574,003, 4,623,364, 4,744,802, and EP publication 228,856, and combinations thereof. The preferred abrasives are aluminum oxide, silicon carbide and garnet. The grade and type of abrasive particles used are selected so as to produce the desired abrasion and surface finish.

Bonded abrasive compositions of the invention containing preformed agglomerates preferably have voids between adjacent, bonded preformed abrasive agglomerates. These voids allow heat to be dissipated and present new abrasive particles to the workpiece, as well as allow workpiece material and/or abrasive composition material a "relief area", i.e., an area to flow when broken away. The voids also allow backings to be integrally molded to the cured abrasive compositions of the invention.

The voids and degree of openness of the abrasive compositions are affected by the weight ratio of abrasive agglomerates to polyurea binder employed. The preformed abrasive agglomerates are preferably present at a weight ratio ranging from about 2:1 to about 10:1 referenced to weight of binder matrix, and more preferably from about 3.5–6 to 1. Abrasive articles of the invention made with individual abrasive particles preferably do not contain voids and preferably have a weight ratio of abrasive to polyurea binder matrix ranging from about 2:1 to about 6:1.

Abrasive articles made solely with individual abrasive particles preferably do not contain voids and preferably contain about 10 to 90 weight percent abrasive, more preferably about 40 to 70 percent abrasive and most preferably about 40 to 60 percent abrasive. Preferably individual abrasive particles range is size from about 0.005 to 3.0 millimeters, more preferably from about 0.03 to 2.0 millimeters. Agglomerates are particularly preferred for those applications requiring a higher rate of cut. Preferably, the agglomerates range in size from about 0.20 to about 2.0 millimeters.

Within some degree of freedom, it is possible to adjust the density of the compositions and articles made from the compositions of the invention by controlling the relative amounts of abrasive material and polyurea binder mixture placed in a given mold cavity, and by using a mixture of agglomerated and non-agglomerated abrasive particles. Addition of more abrasive and binder mixture in the same cavity followed by forced compaction of the mixture produces a wheel or other article having a higher density. Compositions of the invention employing preformed abrasive agglomerates preferably have densities ranging from about 1.0 to about 3.0 $g/cm^3$, more preferably from about 1.1 to about 2.2 $g/cm^3$, and compositions made with individual abrasive particles preferably have densities in ranging from about 1.5 to about 3.0 $g/cm^3$.

Optionally, foaming agents, lubricants, grinding aids, coupling agents, plasticizers, fillers, reinforcing fibers, coloring agents and process aids may be added to the compositions as desired, provided the smear-resistance is not adversely affected. Examples of typical lubricants include lithium stearate and sodium laurel sulfate at concentration of less than or equal to 10 weight percent. Examples of typical grinding aids include $KBF_4$ and calcium carbonate at concentrations of less than or equal to 5 weight percent. Typical coupling agents include silanes and titanates at concentrations of weight percent or less; typical plasticizers include phthalates, alcohols high molecular weight ethers at about 20 weight percent or less. Typical fillers include calcium carbonate, talc, wood pulp, and nut shells at weight percents of 10 percent or less, and typical reinforcing fibers include nylon, polyester, cotton, and rayon having lengths ranging from 0.5 cm to 3.0 cm, having weight percent of 10 percent or less, the fibers having linear density ranging from 1 to 50 decitex, preferably from 5 to 15 decitex.

Method of Making Bonded Abrasive Compositions

The bonded abrasive compositions of the present invention can be made by any of a variety of methods depending on the shape of the article to be formed and whether a backing is utilized. The abrasive particle-liquid mixture can be cast molded, transfer molded, liquid injection molded, reaction injection molded or molded using other techniques well known to those skilled in the art. The preferred method of forming the abrasive composition of the invention is transfer molding. In general, this method may be described in two steps:

(a) combining a curable smear resistant elastomeric polyurea binder matrix being capable on polymerization of forming hard and soft regions as described above with an effective amount of abrasive particles to form a curable abrasive mixture; and (b) curing the mixture to form the bonded abrasive composition.

Exemplary methods of making the abrasive compositions include those methods wherein the mixture is introduced into a mold before curing and also those methods where the mixture is applied to a preformed backing before curing. Other preferred methods include those wherein the polyurea binder is made using a polyfunctional amine which is an oligomeric aromatic polyfunctional amine as described above, and wherein preformed agglomerates of individual abrasive particles are used, such as those disclosed in U.S. Pat. No. 4,799,939.

The particularly preferred method of curing is by heating the mixture for a time and at a temperature and pressure sufficient to cure the mixture. The time, temperature, and pressure are interrelated, and the inventors herein have found that various combinations will produce abrasive compositions within the invention (i.e., a smear-resistant and wear-resistant elastomeric polyurea binder matrix). For example, in comparing the performance results of Examples 1 and 3 (polyurea binders) with Comparative Example A (polyurethane binder), both Examples 1 and 3 are smear-resistant and wear-resistant, even though the conditions used to make the compositions were different. Examples 1 and 3 both used a mold pressure of $8.9 \times 10^4$ N force at 95° C.; however, Example 1 used a time of 30 minutes, while Example 3 utilized a time of 10 hours (the proportions of aminobenzoate and isocyanate were also changed slightly).

Alternative processes may be employed wherein the compositions contain minor fractions of solvent, or where formed, shaped abrasive articles are produced which may be useful as abrasive tumbling media, or block or wedge-shaped forms, or other variations obvious to one skilled in the art.

Bonded Abrasive Articles

Bonded abrasive articles incorporating compositions of the invention can be used for deburring, finishing, and sanding. These abrasive articles may be formulated (with or without backings) into a variety of conventional forms such as wheels, points, discs, cylinders and belts. The abrasive articles may be in the form of small regular or irregular shapes to provide tumbling media, or as a finishing block or wedge. The preferred articles are in the form of wheels and discs. Wheels are typically in the form of a right cylinder having dimensions which may be very small, e.g., a cylinder height on the order of about 5 millimeters, or very large, e.g., 2 meters or more, and a diameter which is very small, e.g., on the order of about 10 millimeters, or very large, e.g., about 1 meter or more. The wheels typically have a central opening for mounting on an appropriate arbor or other mechanical holding means to enable the wheel to rotate in use. Wheel dimensions, configurations, means of support, and means of rotation are well-known in the art.

Figure 2A:
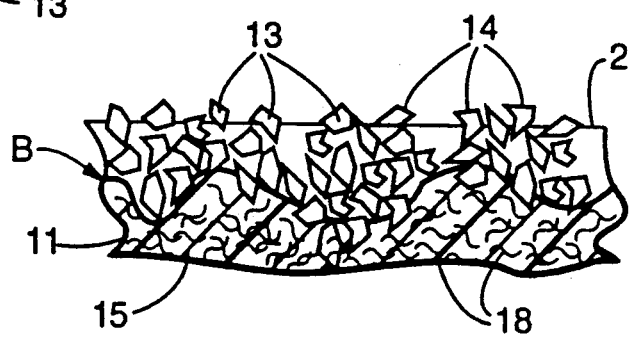
FIG. 2A is an enlarged view of a portion of the fragmentary side cross-sectional view of FIG. 2.
Figure 2:
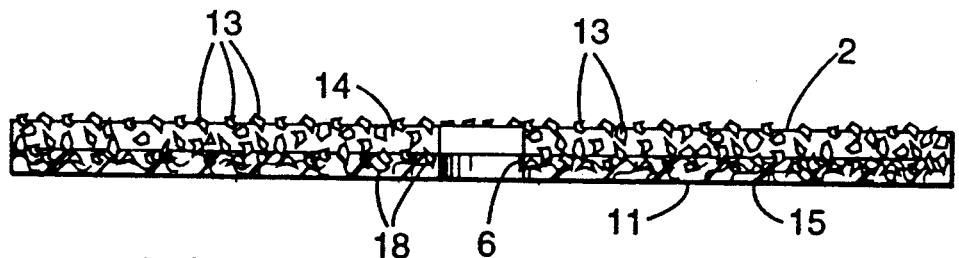
FIG. 2 is a fragmentary side cross-sectional view of a bonded abrasive article in accordance with the present invention, taken along line 2—2, FIG. 1.

Referring to the drawing figures, in FIG. 1 a plan (front) view of a circular disc 1 is illustrated, which incorporates the construction of FIG. 2. Circular disc 1 is representative of a working surface 2 of a bonded abrasive disc according to the present invention. Herein, the working surface 2 is also referred to as a front surface or a top surface, and generally represents the surface used for abrading workpieces. Working surface 2 includes abrasive material in the form of abrasive grains 13 adhered to the working surface 2 of a composite backing of the circular disc 1. Region 6 is a center hole in the circular disc 1 for use in mounting on a rotatable shaft of a grinding apparatus.

Generally, the diameter of the disc will be within the size range of about 6–60 centimeters (cm). Preferably, the disc diameter is about 11–30 cm, and more preferably about 17–23 cm. Many commonly used discs are in the size range of about 17–23 cm in diameter. The disc will also typically have a center hole, i.e., region 6 in FIG. 1, which is usually about 2–3 cm in diameter. eferring to FIG. 2, in general, the bonded circular disc 1 includes a bonded abrasive composition 2 attached to backing 11. Bonded abrasive composition 2 includes abrasive grains 13 bound together with binder 14. As may be seen in FIG. 2A, which is an enlarged cross-sectional view of the disc illustrated in FIG. 2A, a portion of the backing in this embodiment protrudes within the voids of the abrasive composition, producing an extremely tight fit between backing 11 and abrasive composition 2 at the boundary region B.

Referring again to FIG. 2, the structure of the backing 11, if a composite as preferred, consists of a thermoplastic binder material 15 and fibrous reinforcing material 18. Fibrous reinforcing material 18 can be in the form of individual fibers or strands, or in the form of a fiber mat or web. Whether fibrous reinforcing material 18 is in the form of individual fibers or a mat, fibrous reinforcing material 18 is preferably distributed throughout thermoplastic binder material 15 in the body of the backing. More preferably, this distribution is substantially uniform throughout the body of the backing 11.

The thickness of the backing 11 is typically less than about 3.0 millimeter (mm) for optimum flexibility, and material conservation. Preferably, the thickness of the backing 11 is between about 0.5 and 2.0 mm for optimum flexibility. More preferably, the thickness of the backing 11 is between about 1.0 and 1.8 mm.

Any of the backing configurations of the abrasive articles of the present invention provide advantageous strength, wear resistance, and other improved characteristics to the bonded abrasives of the present invention. Whether the fibrous reinforcing material is in the form of individual fibers, or in the form of a mat or web structure, if it is distributed throughout the thermoplastic binder material in the backing, and more preferably distributed uniformly throughout the backing binder, specific advantage is realized, particularly with respect to the strength and wear characteristics.

The bonded abrasive articles of the present invention can possess a wide variety of backing shapes depending upon the end uses of the bonded abrasive articles. For example, the backing can be tapered so that the center portion of the backing is thicker than the outer portions. The backing can have a uniform thickness. The backing can be embossed. The center of the backing can be depressed, or lower, than the outer portions. The backing shape can also be square, rectangular, octagonal, circular, in the form of a belt, or in any other geometric form. The edges of the backing can be purposely bent to make a "cupped" disc if so desired. The edges of the backing can also be smooth or scalloped.

The backing may have a series of ribs, i.e., alternating thick and thin portions, molded into the backing for further advantage when desired for certain applications. The molded-in ribs can be used for designing in a required stiffness or "feel during use" (using finite element analysis), improved cooling, improved structural integrity, and increased torque transmission when the ribs interlock with a back-up pad. These ribs can be straight or curved, radial, concentric circles, random patterns, or combinations thereof.

Figure 3:
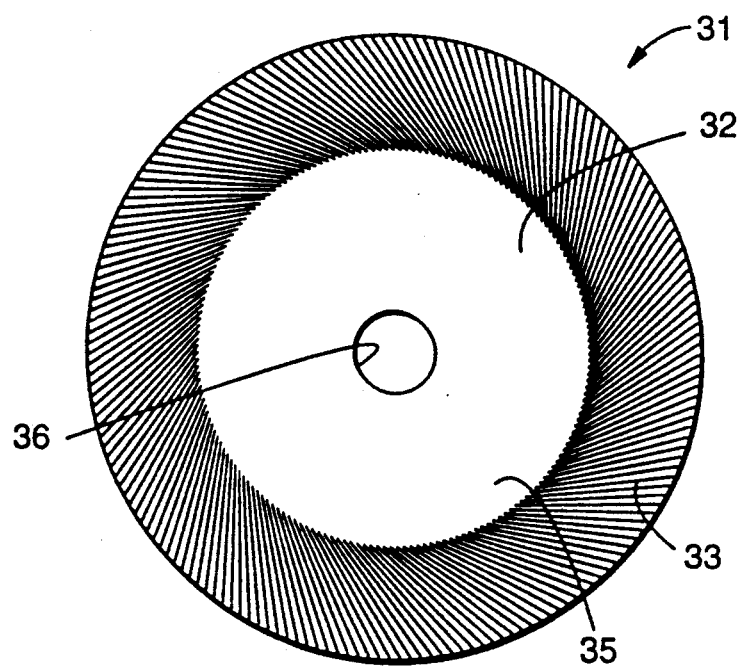
FIG. 3 is a back view of a bonded abrasive article illustrating ribs molded into the backing.

FIG. 3 illustrates a back view of a circular disc 31. Circular disc 31 is representative of a bonded abrasive disc with a series of radial ribs 33 molded into the backing material. This view represents a back surface 32 of the disc 31, which is the surface of the disc opposite that illustrated in FIG. 1. That is, back surface 32 is the surface on which there is typically no abrasive material. Although this particular embodiment shows ribs 33 extending only partially to a center hole 36, leaving a region 35 in which there are no molded-in ribs, ribs 33 could extend along the entire back surface 32 to center hole 36, if so desired.

The molded-in ribs can be at any angle relative to a radius of the disc. That is, the ribs can be disposed at an angle relative to a radius, i.e., a line segment extending from the center of the disc to the outer edge, that is within a range of 0°-90°. The ribs can also be disposed in a pattern having variable angles relative to the radius, to maximize air flow.

Figure 4:
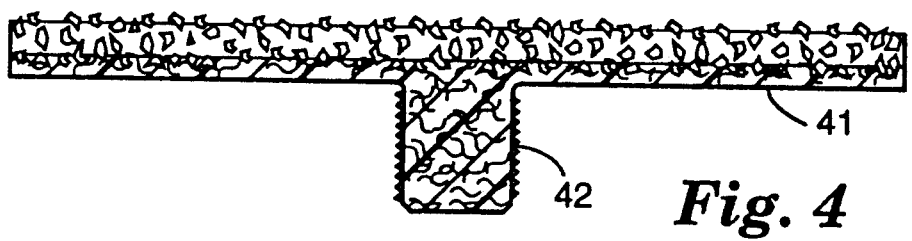
FIG. 4 is an enlarged fragmentary side cross-sectional view of a second embodiment of a bonded abrasive article in accordance with the invention in the form of a disc with an attachment system according to the invention, taken generally analogously to FIG. 2 but incorporating said attachment system.

Additionally, an attachment system to secure the bonded abrasive to a tool and/or an adaptor to a tool, can be molded directly into the backing. Referring to FIG. 4, the bonded abrasive article 40 has a backing 41 and an attachment system 42. Attachment system 42 and backing 41 are unitary and integral, i.e., one continuous (molded) structure. This type of attachment system is further illustrated in U.S. Pat. No. 3,562,968, the disclosure of which is incorporated herein by reference. Typically, if the attachment system is a molded-in attachment system, i.e., molded directly into the backing, then the diameter of the backing will be less than about 12 cm, and preferably less than about 8 cm. Furthermore, the attachment will also preferably consist of a hardened composition of thermoplastic binder material and an effective amount of fibrous reinforcing material distributed throughout the thermoplastic binder material. Such an integral attachment system is advantageous at least because of the ease and certainty of mounting a backing in the center of a hub. That is, if the backing is in the shape of a disc, the attachment system can be located in the geometric center of the disc thereby allowing for centering easily on the hub.

Composite backings useful in the present invention may also have alternative three-dimensional molded shapes, which can provide advantage. Referring to an alternative design of a bonded abrasive article 50 illustrated in FIG. 5, a backing 51 in the form of a disc has a raised edge region 52. Raised edge region 52 is a region of greater thickness in the backing 51 at an outer edge region 53 of the disc relative to the center region 55 of the disc. Preferably, raised edge region 52 generally represents an increased thickness in the backing of about 2-6 mm relative to the thickness in center region 55. Raised edge region 52 can be of any width, but preferably represents a 3.5-5.5 cm ring at the outer edge region 53 of disc backing 51. Typically, and preferably, raised edge region 52 is the only region of backing 51 that has bonded abrasive composition 56. This embodiment thus has a raised ring-shaped region around the outer portion of a disc that has bonded abrasive material. Because there is generally no need to have the bonded abrasive composition on the surface of the center region 55 of the disc, discs with this shape are typically more economical. Although this embodiment is in the shape of a disc, a raised edge region which is bonded abrasive material can be incorporated into a bonded abrasive article of any shape.

Preferably, discs of the present invention may also possess depressed center regions. As seen in the embodiment illustrated in FIG. 5, the backing 51 of a disc is molded into a shape with a depressed center region 58. This can be done for specific advantage. For example, a disc made with a depressed center region 58 is desirable if a retainer nut, i.e., a nut for fastening the disc to a back-up pad, is to be recessed. Furthermore, such a shape can be more stable under a variety of conditions of temperature and humidity.

Figure 5:
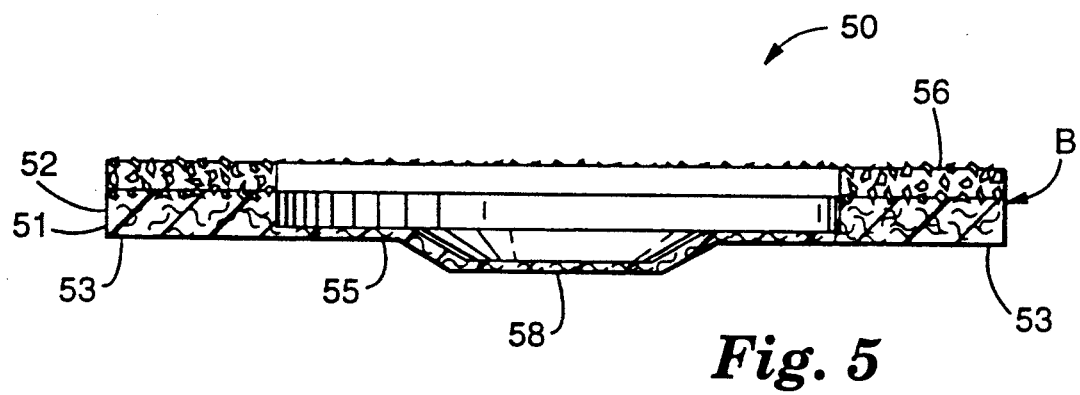
FIG. 5 is an enlarged fragmentary side cross-sectional view of another embodiment of a bonded abrasive article in accordance with the invention, taken generally analogously to FIG. 2 but extending across the entire diameter of the disc, and slightly offset from the middle such that a center hole (analogous to region 6, FIG. 1) is not shown.
Figure 6:
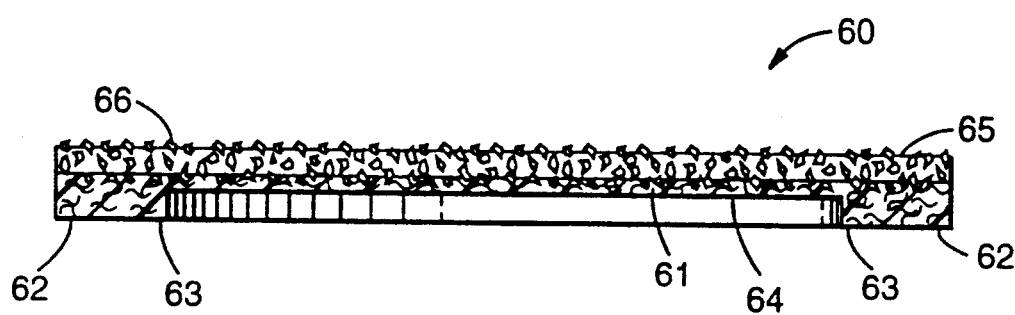
FIG. 6 is an enlarged fragmentary side cross-sectional view of another embodiment of a bonded abrasive article in the form of a disc in accordance with the invention, taken generally analogously to FIG. 2 but extending across the entire diameter of the disc, and slightly offset from the middle such that a center hole (analogous to region 6, FIG. 1) is not shown.

Preferably and advantageously, preferred composite backings useful in the present invention can have edges of increased thickness for added stiffness. As illustrated in FIG. 5, this can result in an article with raised edges which is molded to the abrasive material. Alternatively, as shown in a disc 60 in FIG. 6, backing 61 has a molded-in edge region 62 of increased thickness at the outer edge region 63 of the disc 60. Edge region 62 represents a very small surface area relative to the overall surface area of disc 60, and protrudes away from the abrasive surface 65 of the disc 60, i.e., the surface that contacts the workpiece. Edge region 62, which is in the form of a ring of greater thickness at the outer edge region 63 of backing 61, relative to a center region 64 of the backing, imparts increased stiffness such that the disc can withstand greater stress before warping. In contrast to the embodiment illustrated in FIG. 5, that illustrated in FIG. 6 has bonded abrasive composition of the invention 66 on the surface opposite the surface with the raised edge region 62. That is, the raised edge of the disc shown in FIG. 6 would protrude from the back surface of the backing away from the abraded article during use, whereas the raised edge of the disc shown in FIG. 5 would protrude from the working surface of the backing toward the abraded article during use.

It is also envisioned that words which describe various product designations and descriptions can be formed into the back surface of preferred composite backings useful in the abrasive articles of the present invention if so desired. Furthermore, composite backings can have perforations, i.e., holes in the backing. Such holes would provide dust control by providing a means by which the abraded material can be removed during use from between the workpiece and the abrasive article.

Backing Materials

As previously mentioned, one preferred class of bonded abrasive articles of the present invention generally include a composite backing integrally molded with the bonded abrasive, as shown in the drawing. Composite backings preferably have the following properties. Composite backings are preferably sufficiently tough and heat resistant under severe grinding conditions such that the backings do not significantly disintegrate or deform from the heat generated during a grinding, sanding, or polishing operation. Preferably, composite backings will operably withstand a temperature at the abrading interface of a workpiece of at least about 200° C., preferably at least about 300° C. The phrase "at the abrading interface" in the context of temperature and pressure refers to the instantaneous or localized temperature and pressure the backing experiences at the contact point between the abrasive material on the article and the workpiece. Thus, the equilibrium or overall temperature of the backing would typically be less than the instantaneous or localized temperature at a contact point between the bonded abrasive on the article and the workpiece during operation. Backings that withstand these conditions also typically withstand the temperatures used in the curing of the adhesive layers of a bonded abrasive article without disintegration or deformation.

Composite backings useful in the invention are sufficiently tough such that they will not significantly crack or shatter from the forces encountered during grinding, preferably under severe grinding conditions. That is, the preferred composite backing will preferably operably withstand use in a grinding operation conducted with a pressure at the abrading interface of a workpiece of at least about 7 kg/cm$^2$, preferably at least about 13.4 kg/cm$^2$.

A preferred composite backing useful in the present invention exhibits sufficient flexibility to withstand typical grinding conditions and preferably severe grinding conditions. By "sufficient flexibility" it is meant that the backing will bend and return to its original shape without significant permanent deformation. That is, for preferred grinding operations, a "flexible" backing is one that is sufficiently capable of flexing and adapting to the contour of the workpiece being abraded without permanent deformation of the backing, yet is sufficiently strong to transmit an effective grinding force when pressed against the workpiece.

Preferably, composite backings useful in the invention possess a flexural modulus of at least about 17,500 kg/cm$^2$ under ambient conditions, with a sample size of 25.4 mm (width)×50.8 mm (span across the jig)×0.8-1.0 mm (thickness), and a rate of displacement of 4.8 mm/min, as determined by following the procedure outlined in American Society for Testing and Materials (ASTM) D790 test method, which is incorporated herein by reference. More preferably, composite backings useful herein possess a flexural modulus of between about 17,500 kg/cm$^2$ and about 141,000 kg/cm$^2$ A backing with a flexural modulus less than about 17,500 kg/cm$^2$ would generally be insufficiently stiff to controllably abrade the surface of the workpiece. A backing with a flexural modulus greater than about 141,000 kg/cm$^2$ would generally be too stiff to sufficiently conform to the surface of the workpiece.

Briefly, ASTM D790 test method involves the use of either a three-point loading system utilizing center loading by means of a loading nose, which has a cylindrical surface, midway between two supports, each of which have a cylindrical surface; or a four-point loading system utilizing two load points equally spaced from their adjacent support points, with a distance between load points of either one-third or one-half of the support span. The specimen is deflected until rupture occurs or until the maximum strain has reached 0.05 mm/mm, i.e., a 5% deflection. The flexural modulus, i.e., tangent modulus of elasticity, is determined by the initial slope of the load vs. deflection curve.

A preferred composite backing for use with abrasive compositions of the present invention also exhibits sufficient flexural toughness to withstand severe grinding conditions. By "sufficient flexural toughness" it is meant that the backing will be sufficiently stiff to withstand severe grinding conditions, but not undesirably brittle such that cracks are formed in the backing, thereby decreasing its structural integrity.

The desirable toughness of preferred composite backings used in the present invention can also be demonstrated by measuring the impact strength of the composite backing. The impact strength can be measured by following the test procedures outlined in ASTM D256 or D3029 test methods, which are incorporated herein by reference. These methods involve a determination of the force required to break a standard test specimen of a specified size. Composite backings useful in the present invention preferably have an impact strength, i.e., a Gardner Impact value, of at least about 0.4 Joules for a 0.89 mm thick sample under ambient conditions. More preferably, composite backings useful in the present invention have a Gardner Impact value of at least about 0.9 Joules, and most preferably at least about 1.6 Joules, for a 0.89 mm thick sample under ambient conditions.

A preferred composite backing useful in the present invention also has desirable tensile strength. Tensile strength is a measure of the greatest longitudinal stress a substance can withstand without tearing apart. It demonstrates the resistance to rotational failure and "snagging" as a result of high resistance at discontinuities in the workpiece that a bonded abrasive article might contact during operation. A desirable tensile strength is defined as at least about 17.9 kg/cm of width at about 150° C. for a sample thickness of about 0.75-1.0 mm.

A preferred composite backing useful in the present invention also exhibits appropriate shape control and is sufficiently insensitive to environmental conditions, such as humidity and temperature. By this it is meant that preferred composite backings useful in the present invention possess the above-listed properties under a wide range of environmental conditions. Preferably, composite backings possess the above-listed properties within a temperature range of about 10°-30° C., and a humidity range of about 30-50% relative humidity (RH). More preferably, the backings possess the above-listed properties under a wide range of temperatures, i.e., from below 0° C. to above 100° C., and a wide range of humidity values, from below 10% RH to above 90% RH.

Under extreme conditions of humidity, i.e., conditions of high humidity (greater than about 90% RH) and low humidity (less than about 10% RH), composite backings useful in the present invention will not be significantly affected by either expansion or shrinkage due, respectively, to water absorption or loss. As a result, abrasive articles of the present invention made with a composite backing will not significantly deform, e.g., cup or curl in either a concave or a convex fashion.

By an "effective amount" of a fibrous reinforcing material, it is meant that the backing contains a sufficient amount of the fibrous reinforcing material to impart at least improvement in heat resistance, toughness, flexibility, stiffness, shape control, adhesion, etc., discussed above.

Preferably, the amount of the thermoplastic binder material in composite backings useful in the invention is within a range of about 60-99%, more preferably within a range of about 65-95%, and most preferably within a range of about 70-85%, based upon the weight of the backing. The remainder of the typical, preferred composite backing is primarily a fibrous reinforcing material with few, if any, voids throughout the hardened backing composition. Although there can be additional components added to the binder composition, a composite backing useful in the present invention primarily contains a thermoplastic binder material and an effective amount of a fibrous reinforcing material.

Typically, the higher the content of the reinforcing material, the stronger the composite backing will be; however, if there is not a sufficient amount of binder, then the penetration into the voids of the abrasive composition may be deficient. Furthermore, if there is too much fibrous reinforcing material, the backing can be too brittle for desired applications, and the fibers may somewhat inhibit flow of the unhardened thermoplastic binder into void volume of the abrasive composition, if such abrasive composition includes void volume. (As previously noted, when agglomerates of abrasive particles are used, the abrasive compositions of the invention preferably have some void volume.) By proper choice of thermoplastic binder material and fibrous reinforcing material, such as, for example, a polyamide thermoplastic binder and glass reinforcing fiber, considerably higher levels of the binder can be employed to produce a hardened backing composition with few if any voids and with the properties as described above.

Preferably, hardened composite backing compositions useful in the invention possess a void volume of less than about 0.10%. Herein "void volume" means a volume within a backing or abrasive composition filled with air or gas, i.e., absent solid material. The percent void volume can be determined by comparing the actual density (mass/volume) of the hardened backing or abrasive composition to the total calculated density of the various components. That is, the percent void volume equals [1-(actual density/calculated density)] × 100.

Backing Binder Materials

Preferred binders useful in composite backings useful in the articles of the present invention are thermoplastic materials. A thermoplastic binder material is defined as a polymeric material (preferably, an organic polymeric material) that softens and melts when exposed to elevated temperatures and generally returns to its original condition, i.e., its original physical state, when cooled to ambient temperatures. During the manufacturing process, the thermoplastic binder material is heated above its softening temperature, and preferably above its melting temperature, to cause it to flow and form the desired shape of the composite backing. After the backing is formed, the thermoplastic binder is cooled and solidified. In this way the thermoplastic binder material can be molded into various shapes and sizes.

Thermoplastic materials are preferred over other types of polymeric materials at least because the product has advantageous properties, and the manufacturing process for the preparation of backings is more efficient. For example, a backing formed from a thermoplastic material is generally less brittle and less hygroscopic than a backing formed from a thermosetting material. Furthermore, as compared to a process that would use a thermosetting resin, a process that uses a thermoplastic material requires fewer processing steps, fewer organic solvents, and fewer materials, e.g., catalysts. Also, with a thermoplastic material, standard molding techniques such as injection molding can be used to form the backing. This can reduce the amount of materials wasted in construction, relative to conventional "web" processes.

Although it is preferable to use injection molding techniques to produce backings for the bonded abrasive articles of the present invention to avoid waste, this is not intended to mean that conventional "web" processes cannot be used.

Preferred moldable thermoplastic materials useful in making composite backings useful in the invention are those having a high melting temperature, good heat resistant properties, and good toughness properties such that the hardened backing composition containing these materials operably withstands abrading conditions without substantially deforming or disintegrating. The toughness of the thermoplastic material can be measured by impact strength. Preferably, the thermoplastic material has a Gardner Impact value of at least about 0.4 Joules for a 0.89 mm thick sample under ambient conditions. More preferably, the "tough" thermoplastic materials have a Gardner Impact value of at least about 0.9 Joules, and most preferably at least about 1.6 Joules, for a 0.89 mm thick sample under ambient conditions.

Preferred hardened backing compositions useful in the articles of the invention withstand a temperature of at least about 200° C., preferably at least about 300° C., and a pressure of at least about 7 kg/cm$^2$, preferably at least about 13.4 kg/cm$^2$, at the abrading interface of a workpiece. That is, the preferred moldable thermoplastic materials have a melting point of at least about 200° C., preferably at least about 220° C. Additionally, the melting temperature of the tough, heat resistant, thermoplastic material is preferably sufficiently lower, i.e., at least about 25° C. lower, than the melting temperature of the fibrous reinforcing material. In this way, the reinforcing material is not adversely affected during the molding of the thermoplastic binder. Furthermore, the thermoplastic material in the backing is sufficiently compatible with the material used in the adhesive layers such that the backing does not deteriorate, and such that there is effective adherence of the abrasive material. Preferred thermoplastic materials are also generally insoluble in an aqueous environment, at least because of the desire to use the bonded abrasive articles of the present invention on wet surfaces.

Examples of thermoplastic materials suitable for preparation of composite backings in articles of the present invention include polycarbonates, polyetherimides, polyesters, polysulfones, polystyrenes, acrylonitrile-butadiene-styrene block copolymers, acetal polymers, polyamides, or combinations thereof. Of this list, polyamides and polyesters are preferred. Polyamide materials are the most preferred thermoplastic binder materials, at least because they are inherently tough and heat resistant, typically provide good adhesion to the preferred adhesive resins without priming, and are relatively inexpensive.

The most preferred thermoplastic material from which composite backings useful in the present invention is formed is a polyamide resin material, which is characterized by having an amide group, i.e., —(C=O)NH—. Various types of polyamide resin materials, i.e., nylons, can be used, such as nylon 6/6 or nylon 6. Of these, nylon 6 is most preferred if a phenolic-based make coat, i.e., first adhesive layer, is used. This is because excellent adhesion can be obtained between nylon 6 and phenolic-based adhesives.

Nylon 6/6 is a condensation product of adipic acid and hexamethylenediamine. Nylon 6/6 has a melting point of about 264° C. and a tensile strength of about 770 kg/cm$^2$. Nylon 6 is a polymer of $\epsilon$-caprolactam. Nylon 6 has a melting point of about 223° C. and a tensile strength of about 700 kg/cm$^2$.

Examples of commercially available nylon resins useable as backings in articles according to the present invention include those known under the trade designation "Vydyne" from Monsanto, St. Louis, Mo.; "Zytel" and "Minlon" both from DuPont, Wilmington, Del.; "Trogamid T" from Huls America, Inc., Piscataway, N.J.; "Capron" from Allied Chemical Corp., Morristown, N.J.; "Nydur" from Mobay, Inc., Pittsburgh, Pa.; and "Ultramid" from BASF Corp., Parsippany, N.J. Although a mineral-filled thermoplastic material can be used, such as the mineral-filled nylon 6 resin "Minlon," the mineral therein is not characterized as a "fiber" or "fibrous material," as defined herein; rather, the mineral is in the form of particles, which possess an aspect ratio typically below 100:1.

Reinforcing Material Composite Backings

Besides the thermoplastic binder material, composite backings useful in the invention include an effective amount of a fibrous reinforcing material. Herein, an "effective amount" of a fibrous reinforcing material is a sufficient amount to impart at least improvement in the physical characteristics of the hardened backing, i.e., heat resistance, toughness, flexibility, stiffness, shape control, adhesion, etc., but not so much fibrous reinforcing material as to give rise to any significant number of voids and detrimentally affect the structural integrity of the backing. Preferably, the amount of the fibrous reinforcing material in the backing is within a range of about 1-40%, more preferably within a range of about 5-35%, and most preferably within a range of about 15-30%, based upon the weight of the backing.

The fibrous reinforcing material can be in the form of individual fibers or fibrous strands, or in the form of a fiber mat or web. Preferably, the reinforcing material is in the form of individual fibers or fibrous strands for advantageous manufacture. Fibers are typically defined as fine thread-like pieces with an aspect ratio of at least about 100:1. The aspect ratio of a fiber is the ratio of the longer dimension of the fiber to the shorter dimension. The mat or web can be either in a woven or nonwoven matrix form. A nonwoven mat is a matrix of a random distribution of fibers made by bonding or entangling fibers by mechanical, thermal, or chemical means.

Examples of useful reinforcing fibers in applications of the present invention include metallic fibers or nonmetallic fibers. The nonmetallic fibers include glass fibers, carbon fibers, mineral fibers, synthetic or natural fibers formed of heat resistant organic materials, or fibers made from ceramic materials. Preferred fibers for applications of the present invention include nonmetallic fibers, and more preferred fibers include heat resistant organic fibers, glass fibers, or ceramic fibers.

By "heat resistant" organic fibers, it is meant that useable organic fibers must be resistant to melting, or otherwise breaking down, under the conditions of manufacture and use of the bonded abrasive backings of the present invention. Examples of useful natural organic fibers include wool, silk, cotton, or cellulose. Examples of useful synthetic organic fibers include polyvinyl alcohol fibers, polyester fibers, rayon fibers, polyamide fibers, acrylic fibers, aramid fibers, or phenolic fibers. The preferred organic fiber for applications of the present invention is aramid fiber. Such fiber is commercially available from the Dupont Co., Wilmington, Del. under the trade names of "Kevlar" and "Nomex."

Generally, any ceramic fiber is useful in applications of the present invention. An example of a ceramic fiber suitable for the present invention is "Nextel" which is commercially available from 3M Co., St. Paul, Minn.

The most preferred reinforcing fibers for applications of the present invention are glass fibers, at least because they impart desirable characteristics to the bonded abrasive articles and are relatively inexpensive. Furthermore, suitable interfacial binding agents exist to enhance adhesion of glass fibers to thermoplastic materials. Glass fibers are typically classified using a letter grade. For example, E glass (for electrical) and S glass (for strength). Letter codes also designate diameter ranges, for example, size "D" represents a filament of diameter of about 6 micrometers and size "G" represents a filament of diameter of about 10 micrometers. Useful grades of glass fibers include both E glass and S glass of filament designations D through U. Preferred grades of glass fibers include E glass of filament designation "G" and S glass of filament designation "G." Commercially available glass fibers are available from Specialty Glass Inc., Oldsmar, Fla.; Owens-Corning Fiberglass Corp., Toledo, Ohio; and Mo-Sci Corporation, Rolla, Mo.

If glass fibers are used, it is preferred that the glass fibers are accompanied by an interfacial binding agent, i.e., a coupling agent, such as a silane coupling agent, to improve the adhesion to the thermoplastic material. Examples of silane coupling agents include those known under the trade designations "Z-6020" and "Z-6040," available from Dow Corning Corp., Midland, Mich.

Advantages can be obtained through use of fiber materials of a length as short as 100 micrometers, or as long as needed for one continuous fiber. Preferably, the length of the fiber will range from about 0.5 mm to about 50 mm, more preferably from about 1 mm to about 25 mm, and most preferably from about 1.5 mm to about 10 mm. The reinforcing fiber denier, i.e., degree of fineness, for preferred fibers ranges from about 1 to about 5000 denier, typically between about 1 and about 1000 denier. More preferably, the fiber denier will be between about 5 and about 300, and most preferably between about 5 and about 200. It is understood that the denier is strongly influenced by the particular type of reinforcing fiber employed.

The reinforcing fiber is preferably distributed throughout the thermoplastic material, i.e., throughout the body of a composite backing, rather than merely embedded in the surface of the thermoplastic material. This is for the purpose of imparting improved strength and wear characteristics throughout the body of composite backings. A construction wherein the fibrous reinforcing material is distributed throughout the thermoplastic binder material of a composite backing body can be made using either individual fibers or strands, or a fibrous mat or web structure of dimensions substantially equivalent to the dimensions of the finished backing. Although in this preferred embodiment distinct regions of the backing may not have fibrous reinforcing material therein, it is preferred that the fibrous reinforcing material be distributed substantially uniformly throughout composite backing.

The fibrous reinforcing material can be oriented as desired for advantageous applications of the present invention. That is, the fibers can be randomly distributed, or they can be oriented to extend along a direction desired for imparting improved strength and wear characteristics. Typically, if orientation is desired, the fibers should generally extend transverse (±20°) to the direction across which a tear is to be avoided.

Toughening Agents

Composite backings useful in the present invention can further include an effective amount of a toughening agent. This will be preferred for certain applications. A primary purpose of the toughening agent is to increase the impact strength of composite abrasive backings useful in the invention. By "an effective amount of a toughening agent" it is meant that the toughening agent is present in an amount to impart at least improvement in the backing toughness without it becoming too flexible. Composite backings useful in the present invention preferably include sufficient toughening agent to achieve the desirable impact test values listed above.

Typically, a composite backing useful in the present invention will contain between about 1% and about 30% of the toughening agent, based upon the total weight of the backing. More preferably, the toughening agent, i.e., toughener, is present in an amount of about 5–15 wt-%. The amount of toughener present in a backing may vary depending upon the particular toughener employed. For example, the less elastomeric characteristics a toughening agent possesses, the larger quantity of the toughening agent may be required to impart desirable properties to the backings of the present invention.

Preferred toughening agents that impart desirable stiffness characteristics to composite backings useful in the present invention include rubber-type polymers and plasticizers. Of these, the more preferred are rubber toughening agents, most preferably synthetic elastomers.

Examples of preferred toughening agents, i.e., rubber tougheners and plasticizers, include: toluenesulfonamide derivatives (such as a mixture of N-butyl and N-ethyl-p-toluenesulfonamide, commercially available from Akzo Chemicals, Chicago, Ill., under the trade designation "Ketjenflex 8"); styrene butadiene copolymers; polyether backbone polyamides (commercially available from Atochem, Glen Rock, N.J., under the trade designation "Pebax"); rubber-polyamide copolymers (commercially available from DuPont, Wilmington, Del., under the trade designation "Zytel FN"); and functionalized triblock polymers of styrene-(ethylene butylene)-styrene (commercially available from Shell Chemical Co., Houston, Tex., under the trade designation "Kraton FG1901"); and mixtures of these materials. Of this group, rubber-polyamide copolymers and styrene-(ethylene butylene)-styrene triblock polymers are more preferred, at least because of the beneficial characteristics they impart to backings and the manufacturing process of the present invention. Rubber-polyamide copolymers are the most preferred, at least because of the beneficial impact and grinding characteristics they impart to composite backings useful in the present invention.

If the backing is made by injection molding, typically the toughener is added as a dry blend of toughener pellets with the other components. The process usually involves tumble-blending pellets of toughener with pellets of fiber-containing thermoplastic material. A more preferred method involves compounding the thermoplastic material, reinforcing fibers, and toughener together in a suitable extruder, pelletizing this blend, then feeding these prepared pellets into the injection molding machine. Commercial compositions of toughener and thermoplastic material are available, for example, under the designation "Ultramid" from BASF Corp., Parsippany, N.J. Specifically, "Ultramid B3ZG6" is a nylon resin containing a toughening agent and glass fibers that is useful in the present invention.

Optional Backing Additives

Besides the materials described above, backings useful in the present invention can include effective amounts of other materials or components depending upon the end properties desired. For example, backings can include a shape stabilizer, i.e., a thermoplastic polymer with a melting point higher than that described above for the thermoplastic binder material. Suitable shape stabilizers include, but are not limited to, poly(phenylene sulfide), polyimides, and polyaramids. An example of a preferred shape stabilizer is polyphenylene oxide nylon blend commercially available from General Electric, Pittsfield, Mass., under the trade designation "Noryl GTX 910."

Other materials that can be added to backings useful in the invention for certain applications include inorganic or organic fillers. Inorganic fillers are also known as mineral fillers. A filler is defined as a particulate material, typically having a particle size less than about 100 micrometers, preferably less than about 50 micrometers. Examples of useful fillers for applications of the present invention include carbon black, calcium carbonate, silica, calcium metasilicate, cryolite, phenolic fillers, or polyvinyl alcohol fillers. If a filler is used, it is theorized that the filler fills in between the reinforcing fibers and may prevent crack propagation through the backing. Typically, a filler would not be used in an amount greater than about 20%, based on the weight of the backing. Preferably, at least an effective amount of filler is used. Herein, the term "effective amount" in this context refers to an amount sufficient to fill but not significantly reduce the tensile strength of the hardened backing.

Other useful materials or components that can be added to the backing for certain applications of the present invention include, but are not limited to, pigments, oils, antistatic agents, flame retardants, heat stabilizers, ultraviolet stabilizers, internal lubricants, antioxidants, and processing aids. One would not typically use more of these components than needed for desired results.

Preparation of Abrasive Bonded Articles (Integrally Molded Backing)

A variety of methods can be used to prepare abrasive articles according to the present invention. It is an advantage that many of the preferred compositions (or components) can be used to form an integrally molded backing by injection molding. Thus, precise control over manufacture conditions and shape of product is readily obtained, without undue experimentation. The actual conditions under which backings useful in the invention are injection molded depends on the type and model of the injection molder employed.

To produce an abrasive article of the invention having an integrally molded backing, first the bonded abrasive composition of the invention is made in accordance with the procedures outlined above and in accordance with the examples which follow. After the bonded abrasive composition is fully cured it is ready for application of the backing.

Typically, the components forming the backing are first heated to about 200°-400° C., preferably to about 250°-300° C., i.e., a temperature sufficient for flow. The barrel temperature is typically about 200°-350° C., preferably about 260°-280° C.. The temperature of the actual mold is about 50°-150° C., preferably about 90°-110° C. The cycle time will range between about 0.5 and about 30 seconds, preferably the cycle time is about 1 second. From an economic viewpoint, faster cycle times are preferred.

There are various alternative and acceptable methods of injection molding the backings useful for the articles of the present invention. For example, the fibrous reinforcing material, e.g., reinforcing fibers, can be blended with the thermoplastic material prior to the injection molding step. This can be accomplished by blending the fibers and thermoplastic in a heated extruder and extruding pellets.

If this method is used, the reinforcing fiber size or length will typically range from about 0.5 mm to about 50 mm, preferably from about 1 mm to about 25 mm, and more preferably from about 1.5 mm to about 10 mm. Using this method, longer fibers tend to become sheared or chopped into smaller fibers during the processing. If the backing is composed of other components or materials in addition to the thermoplastic binder and reinforcing fibers, they can be mixed with the pellets prior to being fed into the injection molding machine. As a result of this method, the components forming the backing are preferably substantially uniformly distributed throughout the binder in the backing.

Alternatively, a woven mat, a nonwoven mat, or a stitchbonded mat of the reinforcing fiber can be placed into the mold. The thermoplastic material and any optional components can be injection molded to fill the spaces between the reinforcing fibers in the mat. In this aspect of the invention, the reinforcing fibers can be readily oriented in a desired direction. Additionally, the reinforcing fibers can be continuous fibers with a length determined by the size and shape of the mold and/or article to be formed.

In certain situations, a conventional mold release can be applied to the mold for advantageous processing. If, however, the thermoplastic material is nylon, then the mold typically does not have to be coated with a mold release.

Additionally, two or more layers can be extruded at one time to form composite backings useful in the articles of the present invention. For example, through the use of two conventional extruders fitted to a two-layer film die, two-layer backings can be formed in which one layer provides improved adhesion for the binder and abrasive grains, while the other layer may contain, for example, a higher level of filler, thereby decreasing the cost without sacrificing performance.

Other Abrasive Articles Within the Invention

Bonded abrasive compositions of the invention may be applied (i.e., poured or spread onto) and adhered to a preformed backing to create bonded abrasive articles, preformed backings selected from materials such as rigid metal, rigid and flexible polymeric materials, composites, fabrics, and the like. The bond system which binds the abrasive composition to the preformed backing may be the same as or different from the polyurea binder or the bond system holding aggregate particles together.

The invention is further illustrated by the following non-limiting examples where all parts and percentages are by weight unless otherwise specified. Additional details on the materials used in these examples is given in the "Material Description" section below. Abrasive particle sizes are as specified in ANSI Standard B74.18 unless designated by the letter P prefix which specifies that the particle size complies FEPA-Standard 43-GB-1984. A summary of the composition listing the components and amounts present in each wheel of Examples 1-14, and Control Examples A-C is given in Table 1 below. These examples should not be interpreted as literally limiting the scope of the invention.

The following list outlines all materials used in the Examples and Comparative Examples.

Materials Description

ADIPRENE BL16—trade designation for a poly(tetramethylene glycol) polymer reacted with two moles of toluene diisocyanate to produce a difunctional isocyanate prepolymer which is subsequently blocked with methyl ethyl ketoxime and has an equivalent weight of 757. It is commercially available from Uniroyal Chemical Co., Inc.

ADIPRENE BL-90—trade designation for a poly(hexamethylene adipate) polymer reacted with two moles of toluene diisocyanate to produce a difunctional isocyanate prepolymer which is subsequently blocked with methyl ethyl ketoxime and has an equivalent weight of 801. It is commercially available from Uniroyal Chemical Co., Inc.

CAYTUR 31—trade designation for a 50% dispersion of methylene dianiline sodium chloride complex in dioctylphthalate, has an equivalent weight of 230 and is commercially available from Uniroyal Chemical Co., Inc.

CURITHANE 103—trade designation for a mixture of 70% methylene dianiline and 30% polymeric methylene dianiline, has a functionality of about 2.3, has an equivalent weight of about 101 and is commercially available from Dow U.S.A.

DESMODUR N3200—trade designation for a polymeric hexamethylene diisocyanate which has a functionality of 3, has an equivalent weight of 180 and is commercially available from the Mobay Corporation.

DYTEK A—trade designation for a 1,5-diamino-2-methyl pentane which is commercially available from Du Pont Co. under the trade designation DYTEK A and has an equivalent weight of 58.

ISONATE 143L—trade designation for a polymeric MDI (methylene diisocyanate) having an isocyanate equivalent weight of about 145 and a functionality of 2.1 and commercially available from Dow Chemical U.S.A.

MONDUR MRS-5—trade designation for a polymeric methylene diisocyanate which has a functionality of 2.4, has an equivalent weight of 140 and is commercially available from the Mobay Corporation.

PAPI 2020—trade designation for a polymeric MDI (methylene diisocyanate) having an isocyanate equivalent weight of 140 and a functionality of 3.0 and commercially available from Dow Chemical U.S.A..

POLAMINE 650—trade designation for an amine similar to the aminobenzoate known under the trade designation POLAMINE 1000 but having an average molecular weight of about 650 and equivalent weight of about 375. Commercially available from Air Products and Chemical Co., formerly available from the Polaroid Corporation.

POLAMINE 1000—trade designation for a polytetramethylene-oxide-di-p-aminobenzoate having an average molecular weight of about 1240 and an equivalent weight of about 620. Commercially available from Air Products and Chemicals Co. (Formerly available from the Polaroid Corporation.)

POLYMEG 1000—trade designation for a poly(tetrahydrofuran) polymer that is terminated with two hydroxyl groups and commercially available from QO Chemical, Inc. and has an equivalent weight of 485.

POLY THF 750—trade designation for bis(3-amino propyl) polytetrahydrofuran which is commercially available from BASF Corporation, and has an equivalent weight of 375.

QUADROL—trade designation for N,N,N',N'-tetrakis(2-hydroxy-propyl) ethylene diamine, commercially available from BASF Corporation and has an equivalent weight of 73.

TREN—trade designation for tris(2-aminoethyl) amine which is commercially available from W. R. Grace & Co. and has an equivalent weight of 49.

POLYMEG 2000—trade designation for a polytetramethylene ether glycol having an average active hydrogen functionality of 2 and an average molecular weight of about 2000, commercially available from QO Chemical, Inc. (long-chain saturated prepolymer).

Polybd R-45HT—trade designation for a hydroxy terminated polybutadiene (long-chain diene prepolymer) having an average active hydrogen functionality between 2.4 and 2.6 and an average molecular weight of about 2800 commercially available from Atochem Inc.

L-562—trade designation for a silicone surfactant commercially available from Union Carbide Corporation.

KR-55—trade designation for tetra(2,2 diallyoxymethyl)butyl, di(ditridecyl)phosphito titanate (titanate coupling and dispersing agent) commercially available from Kenrich Petrochemicals Inc.

PALATINOL 711-P—trade designation for a mixed C7, C9 and C10 dialkyl phathalates (plasticizer and viscosity reducer) commercially available from BASF Corporation.

TRIGONOX 21-OP50—trade designation for a t-butyl peroxy-2-ethylhexanoate (crosslinking initiator) commercially available from Akzo Chemical Co.

MOLECULAR SIEVE 3A—trade designation for a $K_{12}[(AlO_2)_{12}(SiO_2)_{12}] \cdot xH_2O$, a potassium form of type "A" crystal structure which is an alkali metal aluminosilicate commercially available from UOP Molecular Sieve Absorbents Co.

TEST METHOD 1

Perforated Screen Grinding Test

The wheel in each case was secured between appropriate side flanges and mounted on an arbor which rotated at 1,200 rpm. Prior to testing, the wheels were dressed with a diamond-tipped tool. A metal workpiece consisting of a 50 mm×280 mm piece of 16 gauge 1008 CRS perforated screen, 4 mm diameter staggered holes, 46% open, stock pattern number 041, commercially available from Harrington & King, Chicago, Ill., was urged against the rotating wheel in each case with a force of 2625 N/m. The test metal perforated strip was moved up and down (one cycle) at the rate of 12 cycles per minute, with an up and down displacement of 140 mm. The perforated test metal strip was urged against the rotating wheel for one minute after which time the weight loss of the perforated metal strip and of the wheel were measured. The weight loss of the wheel was divided by the total weight of the wheel and the product multiplied by 100 to give a percent wheel wear (Table 2). Further reported in Table 2 is an efficiency value, which is the cut or weight loss of perforated metal divided by the percent wheel wear. Table 2 also notes if any smear or transfer of the wheel binder to the test strip was observable. Smear was reported if any visible signs of the wheel binder were present on the workpiece. It is preferred to have a balance of percent wear and a high efficiency. However, depending on the properties of the workpiece desired, this balance may be shifted in the direction of a low percent wear or a high efficiency.

Test Method 2

Steel Ring Grinding Test

The Steel Ring Grinding Test provided an automated means for evaluating abrasive articles of the invention in a variety of use conditions. In this test, the workpiece was a mild steel ring of outside diameter 0.5 cm, inside diameter 28.0 cm, and a thickness of between 5 and 11 cm. The ring was mounted on a rotating table which turned at 45 rpm. The abrasive disc to be tested was mounted on a 17.8 cm diameter hard back-up pad with a 10.2 cm hub, available commercially as 3M Part Nos. 05144-45192 and 51144-45190, respectively, from Minnesota Mining and Manufacturing Company, St. Paul, Minn. The disc/back-up pad assembly was then mounted on an electric grinder capable of rotating the disc at 5000 rpm (under zero load). The grinder was in turn mounted on a constant load device known under the trade designation "MECHANITRON CFD 2100", from Mechanitron Corporation, Roseville, Minn. which assured the application of a 4.54 kg load on the abrasive disc against the ring workpiece. The positioning of the abrasive disc/back-up pad/constant load device assembly was provided by mounting the assembly on a robot known under the trade designation "Type T3 Industrial Robot" previously available from Cincinnati Milacron, Industrial Robot Division, Greenwood, S.C. The grinder assembly was positioned to abrade the ring at about the 3 o'clock position along its surface.

At the start of each test, the ring was weighed and the initial surface finish (arithmetic average ($R_a$) of the scratch depth) was determined using a profilometer commercially available under the trade designation "Surtronic 3" from Taylor Hobson, Leicester, England. The ring was then returned to the rotating table. Prior to mounting the abrasive disc to be tested on the back-up pad, the disc was weighed. The robot positioned the driven abrasive disc so that it was operated on the flat face of the ring and was tilted at an approximate 6° angle out of plane of the ring and about an axis defined by a radius of the ring so that the disc was "heeled" and slightly flexed by its contact with the ring surface. Each disc tested was operated in this position for 1 minute.

Each disc tested was then rotated +10° about an axis essentially parallel to the ring tangent so that the outside edge of the ring was contacted and the test continued for 30 seconds.

Each disc tested was then rotated −10° so that again the flat face was contacted for 1 minute, and then rotated an additional −10° so that the inside edge of the ring was contacted for 30 seconds.

The 4-minute test cycle in each case was completed by rotating the disc +10° to again contact the flat face of the ring for a final 1 minute of grinding. In some of the tests the ring weight, abrasive disc weight, and workpiece finish were determined after each 4-minute cycle. The test continued for a total of 20 4-minute cycles or until the disc failed by no longer effectively abrading the workpiece, i.e., there was no further abrasive left on the disc.

Upon completion of the test cycles, the workpieces were weighed to determine the amount of workpiece material removed (cut), the abrasive disc weighed to determine the amount of abrasive remaining, and the final surface finish measured.

EXAMPLES

Example 1

An abrasive wheel was prepared by mixing 230 grams of a polyfunctional amine available under the trade designation of POLAMINE 1000 (soft segment), 66 grams of a polyfunctional isocyanate available under the trade designation ISONATE 143L (hard segment) and 1300 grams of abrasive agglomerates having a size of 16-32 grade which were made from grade 180 aluminum oxide abrasive particles. The polyfunctional amine and polyfunctional isocyanate were premixed for 1 minute in a large container using an air driven propeller type stirrer, followed by addition of the abrasive agglomerate particles with stirring continued for 1 minute after the abrasive agglomerates were blended in. The abrasive agglomerates used in these examples were composed of 80% grade P 180 aluminum oxide, 5% of an A-stage base-catalyzed phenol-formaldehyde resin binder (70% solids), 7% cryolite and 1% glass bubbles having a size range of about 5—75 micrometers with an average size of about 35 micrometers. These agglomerates were made according to the teaching of U.S. Pat. No. 4,799,939.

A 1200 g portion of mixture described above was placed in a mold to produce a abrasive wheel having an 203 mm outside diameter, 32 mm center hole, and a thickness of 25 mm. After closing the mold, the mold was placed between the heated platens of a hydraulic press at a pressure of $8.9 \times 10^4$ N force. The platens were heated to 95° C. and the mold retained in the press at this pressure for 30 minutes. The resultant wheel had an average density of 1.5 g/cm$^3$.

The wheel was removed from the mold and evaluated according to the procedure of Test Method 1, and the results tabulated in Table 2.

Example 2

The wheel of Example 2 was prepared and evaluated in the same way as Example 1 with exception that the polyfunctional isocyanate PAPI 2020 was substituted for the polyfunctional isocyanate ISONATE 143L as the hard segment of the polyurea binder.

Example 3

The wheel of Example 3 was prepared and evaluated in the same way as Example 1 with exception that 200 g (instead of 230 g) of the polyfunctional amine POLAMINE 1000, 58 g of the polyfunctional isocyanate DESMODUR N3200 (hard segment), and 1118 g (instead of 1300 g) of the abrasive agglomerate were used. 1200 g of the binder and abrasive mixture were placed in the mold of Example 1 followed by curing for 10 hours at 95° C. instead of for 30 minutes as in Example 1.

Example 4

In this example, Examples 5—8, and Control Examples A and B, the soft segments were di-functional isocyanates. To 1092 g of the blocked difunctional isocyanate prepolymer ADIPRENE BL-16 there was added 84 g of the diamino-methylpentane DYTEK A (hard segment), a difunctional amine, and the resultant combination was mixed for 10 minutes using the stirrer described in Example 1. To 300 g of this resin mixture there was blended in 1300 g of abrasive agglomerates described in Example 1, followed by stirring for an additional minute to produce a consistent mixture. A 1200 g portion of binder and abrasive mixture placed in mold and pressed as in Example 1. After pressing, the top of the mold was removed, the opened mold placed in a hot air convection oven for 2 hours at 135° C., the resultant wheel removed from the mold and the removed wheel post cured 4 hours at 135° C. The wheel was evaluated as described in Example 1.

Example 5

A wheel was prepared and evaluated like the wheel of Example 4 with exception that 1000 g (instead of 1092 g) of the blocked difunctional isocyanate prepolymer ADIPRENE BL-16, and 65 g of the amine TREN (instead of 84 g of DYTEK A) were thoroughly mixed for about 5 minutes. To 300 g of this resin mixture there was added 1300 g abrasive agglomerates. After mixing for about 5 minutes a 1200 g portion of this mixture was placed in a mold and cured as described in Example 4.

Example 6

A wheel was prepared and evaluated like the wheel of Example 4 with exception that the ingredients were 250 g of the blocked difunctional isocyanate prepolymer ADIPRENE BL-16, 86 g of the dianiline sodium chloride complex CAYTUR31, and 1456 g abrasive agglomerates. A 1200 g portion of this mixture was cured in the mold used in Examples 1-5 for 18 hours at 120° C.

Example 7

The wheel of this example was prepared and evaluated like the wheel of Example 4 with exception that the ingredients were 317 g of the dianiline CURITHANE 103 (hard segment) which was preheated to 65° C. to cause melting whereupon was added 2421 g of the blocked difunctional isocyanate prepolymer ADIPRENE BL-16 (soft segment) followed by stirring for 1 hour. To 300 g of this resin mixture was added with mixing 1300 g abrasive agglomerates. A 1200 g portion of the abrasive slurry was cured in a mold (described in Example 1) for 4 hours at 135° C., then the molded wheel was removed from the mold and postcured for 4 more hours at 135° C.

Example 8

Preparation and evaluation of the wheel of this example was the same as Example 4 with exception that the ingredients were 34 g of the dianiline CURITHANE 103 which was warmed to 65° C. and then slowly added with stirring to 270 g of the blocked difunctional isocyanate prepolymer ADIPRENE BL-90 which had been prewarmed to 60°-70° C. Then 1300 g of abrasive agglomerates were added with thorough mixing. A 1200 g portion of the mixture was pressed in the mold in the platen press as described in Example 1, the mold opened after pressing, the wheel removed, and the wheel postcured by heating for 4 hours at 135° C.

Control Example A

Control Example A was prepared and evaluated similar to Example 2 with exception that the poly(tetrahydrofuran) polymer POLYMEG 1000 polyol was used in place of the aminobenzoate POLAMINE 1000. In this control 230 g of poly(tetrahydrofuran) polymer (soft segment) was mixed with 66 g of the polymeric methylene diisocyanate PAPI 2020 and 1300 g of abrasive agglomerates. A 1200 g portion of the abrasive and resin binder mixture was placed in the mold described in Example 1 and cured at 135° C. for 10 hours (without increasing the pressure as was done in Example 1), followed by post curing at 135° C. for 4 hours. This wheel had excessive wear as compared to Example 2.

Control Example B

Control Example B was prepared and evaluated similar to that described in Example 4 with the following exceptions:

For Control B the ingredients were 1000 g of the blocked difunctional isocyanate prepolymer ADIPRENE BL-16 which was mixed for 10 minutes with 96 g of the hydroxy-terminated diamine QUADROL (hard segment) and 0.3 g of dibutyl tin dilaurate catalyst. Thereafter to 300 g of this resin mixture there was added 1300 g of abrasive agglomerates.

A 1200 g portion of resin/abrasive agglomerate mixture was separately placed in the mold described in Example 1 and cured at 135° C. for 14 hours, respectively, followed by post curing after removing the wheel from the mold for 4 hours at 135° C.

Example 9

A low molecular weight oligomeric polyamine (soft segment) was mixed with 1,4-butane diol (hard segment) and cured with the polyfunctional isocyanate PAPI 2020 (hard segment) to bond agglomerate abrasive particles into a wheel using the procedure as described in Example 1. The abrasive agglomerates used in this example were composed of 80% grade P 120 aluminum oxide, 6% of an A-stage base-catalyzed phenol-formaldehyde resin binder (70% solids), 9% cryolite and 5% wood pulp and had a particle size of about 16-32 grade. These agglomerates were made according to the teaching of U.S. Pat. No. 4,652,275. Details of the composition are given in Table 1.

The wheel of Example 9 was evaluated similar to the procedure described in Test Procedure 1 above with exception that the wheel was rotated at 2000 rpm. The results are reported in Table 2 below. The wheel performed satisfactorily and showed no smear or transfer of wheel binder to the test workpiece.

Example 10

An abrasive wheel was prepared by mixing 500 grams of the polytetramethyleneoxide-di-p-aminobenzoate known as POLAMINE 1000, 113 grams of the polymeric methylene diisocyanate PAPI 2020, and 2452 grams of abrasive agglomerates as described in Example 9. The aminobenzoate and diisocyanate were premixed in a large container, followed by addition of the abrasive agglomerate particles. After addition of the abrasive agglomerate particles, the mixture in the container was tumbled for 5 minutes.

A 1200 g portion of this mixture was placed in a mold as described in Example 1. After closing the mold, the mold was placed between the heated platens of a hydraulic press at a pressure of $8.9 \times 10^4$ N force. The platens were heated to 95° C. and the mold was retained in the press at this pressure for 30 minutes.

The wheel of this example was evaluated in the same manner as the wheel of Example 9.

Example 11

The wheel of this example was prepared in a mold as described in Example 1 and evaluated in the same manner as the wheel of Example 9 with the following exceptions:

The abrasive wheel was prepared by mixing 250 g of the poly-tetramethyleneoxide-di-p-aminobenzoate know under the trade name "POLAMINE 1000", 60 g of the polymeric methylene diisocyanate known under the trade name "PAPI 2020", and 1240 grams of abrasive agglomerates having a size of 16-32 grade. The abrasive agglomerates were composed of 80% of 240 silicone carbide abrasive particles, 9% of an A-stage based-catalyzed phenolformaldehyde resin binder (70% solids), 11% cryolite and 1% hollow glass bubbles having an average diameter of 35 micrometers. These agglomerates were made according to the teaching of U.S. Pat. No. 4,799,939.

Example 12

In this example, non-agglomerate, abrasive particulate was used. To 200 g of the polytetramethyleneoxide-di-p-aminobenzoate known as POLAMINE 1000, there was added 46 g of the polymeric methylene diisocyanate PAPI 2020 and after stirring for 5 minutes 2214 g of 80 grade aluminum oxide abrasive particles were added, followed with thorough mixing for about 10 minutes. A 1800 g portion of this mixture was placed in a mold and cured as described in Example 1. This wheel was evaluated as described in Example 9 above and results reported in Table 2.

Example 13

The abrasive wheel of this example was prepared and evaluated in the same way as Example 1 with exceptions noted below. In this example the ingredients were 400 g of the polytetramethylene-oxide-di-p-aminobenzene POLAMINE 1000 and 93 g the polymeric methylene diisocyanate MONDUR MRS-5. The ingredients were thoroughly premixed, and then mixed with 1479 g of 60 grade aluminum oxide abrasive particles. A 1700 g portion of abrasive/binder mixture were cured in a mold as described in Example 1 at 120° C. for 30 minutes and post cured at 120° C. after removal from the mold for one additional hour.

The wheel of this example was evaluated as described in Test Method 1 with exception that the wheel was rotated at 2000 RPM and the perforated metal workpiece was moved up and down at the rate of 30 cycles per minute. Additional information and test results are given in Tables 1 and 2 below.

Example 14

The wheel of this example was prepared and evaluated the same as Example 13 with exception that 1500 g of 60 grade silicon carbide abrasive particles were used instead of aluminum oxide. A 1500 g portion of the abrasive/binder were cured in the mold.

Control Example C

This abrasive wheel was made with a polyurethane elastomeric binder which was made by mixing 500 g of the polytetrahydrofuran polymer POLYMEG 2000 polyol, 72 g of the polymeric methylene diisocyanate PAPI 2020 and 0.2 g dibutyl tin dilaurate catalyst. The premixed binder was blended with 1288 g 60 grade silicon carbide abrasive particles. A 1800 g portion of this abrasive/binder mixture was cured as described in Example 1 for 30 minutes at 95° C. in the mold, followed by post curing out of the mold for one hour at 95° C. The resultant wheel was evaluated in the same way as Example 13.

TABLE 1

| Example | Soft Segment Description | Weight | Hard Segment Description | Weight | Abrasive size, type | Wheel Weight | Wheel Density |
|---|---|---|---|---|---|---|---|
| 1 | Polamine 1000 | 187 g | Isonate 143L | 42 g | Ag—P180 $Al_2O_3$ | 971 g | 1.5 g/cm$^3$ |
| 2 | Polamine 1000 | 187 g | PAPI 2020 | 42 g | Ag—P180 $Al_2O$ | 971 g | 1.5 g/cm$^3$ |
| 3 | Polamine 1000 | 174 g | Desmodur N3200 | 51 g | Ag—P180 $Al_2O_3$ | 975 g | 1.5 g/cm$^3$ |
| 4 | Adiprene BL-16 | 209 g | DYTEK A amine | 16 g | Ag—P180 $Al_2O_3$ | 975 g | 1.5 g/cm$^3$ |
| 5 | Adiprene BL-16 | 211 g | TREN | 14 g | Ag—P180 $Al_2O_3$ | 975 g | 1.5 g/cm$^3$ |
| 6 | Adiprene BL-16 | 167 g | CAYTUR 31 | 58 g | Ag—P180 $Al_2O_3$ | 975 g | 1.5 g/cm$^3$ |
| 7 | Adiprene BL-16 | 199 g | Curithane 103 | 26 g | Ag—P180 $Al_2O_3$ | 975 g | 1.5 g/cm$^3$ |
| 8 | Adiprene BL-90 | 202 g | Curithane 103 | 25 g | Ag—P180 $Al_2O_3$ | 973 g | 1.5 g/cm$^3$ |
| Comp Ex A | Polymeg 1000 polyol | 173 g | PAPI 2020 | 43 g | Ag—P180 $Al_2O_3$ | 977 g | 1.5 g/cm$^3$ |
| Comp Ex B | Adiprene BL-16 | 205 g | QUADROL | 20 g | Ag—P180 $Al_2O_3$ | 975 g | 1.5 g/cm$^3$ |
| 9 | Polamine 650 | 216 g | PAPI 2020 / 1,4-butanediol | 91 g / 8 g | Ag—P120 $Al_2O_3$ | 1258 g | 1.4 g/cm$^3$ |
| 10 | Polamine 1000 | 196 g | PAPI 2020 | 44 g | Ag—P120 $Al_2O_3$ | 960 g | 1.4 g/cm$^3$ |
| 11 | Polamine 1000 | 250 g | PAPI 2020 | 60 g | Ag-240 SiC | 240 g | 1.8 g/cm$^3$ |
| 12 | Polamine 1000 | 146 g | PAPI 2020 | 34 g | 80 $Al_2O_3$ | 1620 g | 2.2 g/cm$^3$ |
| 13 | Polamine 1000 | 345 g | Mondur MRS-5 | 80 g | 60 $Al_2O_3$ | 1275 g | 2.1 g/cm$^3$ |
| 14 | Polamine 1000 | 304 g | Mondur MRS-5 | 21 g | 60 SiC | 1125 g | 1.8 g/cm$^3$ |
| Comp Ex C | Polymeg 2000 | 403 g | PAPI 2020 | 58 g | 60 SiC | 1039 g | 1.9 g/cm$^3$ |

Ag—P180 $Al_2O_3$ agglomerate was made per the teaching of Example 1 of U.S. Pat. No. 4,799,939
Ag—P120 $Al_2O_3$ agglomerate was made as per the teaching of Example 1 of U.S. Pat. No. 4,652,275
Ag-240 SiC agglomerate was made per the teaching of Example 1 of U.S. Pat. No. 4,799,939 except grade 240 SiC was employed instead of aluminum oxide.

TABLE 2

| Example | Mineral/Resin Ratio | Cut, g/min. | % Wear (% wt. loss/min) | Efficiency (cut/% wear) | Smear |
|---|---|---|---|---|---|
| 1 | 4.2 | 8.0 | 0.13 | 62 | No |
| 2 | 4.2 | 11.0 | 0.25 | 44 | No |
| 3 | 4.3 | 9.0 | 0.66 | 13 | No |
| 4 | 4.3 | 9.0 | 0.27 | 35 | No |
| 5 | 4.3 | 11.0 | 1.10 | 10 | No |
| 6 | 4.3 | 7.0 | 0.11 | 63 | No |
| 7 | 4.3 | 9.0 | 0.23 | 39 | No |
| 8 | 4.3 | 10.0 | 0.45 | 22 | No |
| Comp Ex A | 4.5 | 10.0 | 9.36 | 1 | No |
| Comp Ex B | 4.3 | 11.0 | 5.61 | 2 | No |
| 9* | 4.0 | 15.2 | 1.60 | 10 | No |
| 10* | 4.0 | 9.3 | 0.58 | 33 | No |
| 11* | 4.0 | 6.9 | 0.34 | 21 | No |
| 12* | 9.0 | 8.2 | 1.82 | 7 | No |
| 13** | 3.0 | 5.5 | 0.28 | 20 | No |
| 14** | 3.0 | 5.2 | 0.25 | 22 | No |

TABLE 2-continued

| Example | Mineral/ Resin Ratio | Cut, g/min. | % Wear (% wt. loss/min) | Efficiency (cut/% wear) | Smear |
|---|---|---|---|---|---|
| Comp C | 2.3 | 6.1 | 2.44 | 3 | No |

*These wheels were tested under different conditions as described in Example 9.
**These wheels were tested under different conditions as described in Example 13.

The test results of Examples 1, 2, 3 and 10 show that wheels having polyurea binder matrices employing different polyfunctional isocyanate hard segments produce wheels which are smear resistant, and have significantly improved wear and efficiency characteristics when compared to Comparative Example A where the binder matrix is a polyurethane polymer. Examples 4, 5, 6, 7 and 8 show that the use of polyurea binder matrices formed from the reaction product of an isocyanate prepolymer which forms a soft segment upon polymerization and various polyfunctional amines functioning as hard segments upon polymerization have significantly improved performance when compared to the polyurethane binder of Comparative Example A. In Comparative Example B the hard segment was a polyfunctional hydroxy-terminated amine which produced a polyurethane, with the resultant wheel performing unsatisfactorily. Example 9 demonstrates the use a polyurea binder containing minor amounts (roughly 2.5 weight percent) of a polyurethane polymer. Examples 9, 10 and 11 demonstrate the use of alternate abrasive agglomerates where the particle size of the abrasive granules is varied. Examples 12-14 show wheels made with the polyurea binder matrix and individual non-agglomerate abrasive particles with Examples 13 and 14 showing a preferred binder. Comparative Example C shows that an abrasive wheel having a polyurethane binder matrix and individual, non-aggregate abrasive particles exhibits low and unsatisfactory efficiency.

Examples 15-18

Examples 15-18 illustrate the usefulness of another embodiment of this invention. In these examples, various grades of bonded abrasive discs having an integral reinforced thermoplastic backing were made and tested. Performance was measured using the Steel Ring Grinding Test (Test Method 2). The test results are presented in Table 3.

Example 15

Bonded Abrasive Disc with Injection Molded Backing

A bonded abrasive disc having a mineral:resin ratio of 6:1 was prepared by mixing 33.0 grams of a polyfunctional amine known under the trade designation of "Polamine 1000"(soft segment); 7.7 grams of a polyfunctional isocyanate known under the trade designation "PAPI 2020"(hard segment); and 248.0 grams of agglomerate abrasive having a size range of 16-32 grade which was made from 50× aluminum oxide abrasive grains (80%), A-staged base-catalyzed 70% solids resole phenolic resin (5%), cryolite (7%), and soda-lime borosilicate glass bubbles having an average size of 35 micrometers and a size range of 5-75 micrometers, known under the trade designation "3M" from Minnesota Mining and Manufacturing Company, St. Paul, Minn. (1%). The agglomerate as made according to the teachings of U.S. Pat. No. 4,799,939, incorporated herein by reference. The polyfunctional amine and polyfunctional isocyanate were premixed for one minute in a large container using an air-driven propeller type stirrer followed by the addition of the abrasive agglomerate particles with stirring continuing for one minute after the abrasive agglomerate was added. A 208.0 gram portion of the resulting mixture was placed in a mold to produce a balanced disc having a 17.8 cm outside diameter, 2.2 cm center hole, and a thickness of 4.75 mm. The mold was closed and placed in a press heated to 95° C. and subjected to a compressive force of $8.9 \times 10^4$ N for 30 minutes. The disc was then removed from the mold. The resultant disc had an average density of 1.83 g/cm$^3$ A backing was then applied to the molded abrasive disc by an injection-molding technique. The general procedure for making a backing for the disc by injection molding was as follows. A blend of the following materials was prepared from pellets previously dried for 4 hours at 80° C. by mixing with a blade mixer: 1) thermoplastic nylon resin containing glass fibers known under the trade designation "ULTRAMID B3EG3" from BASF Corp., Polymers Division, Parsippany, N.J. (95%); 2) styrene copolymer toughening agent, known under the trade designation "KRATON FG1901X" from Shell Chemical Company, Houston, Tex. (2%); and 3) gray colorant, known under the trade designation "PANTENE 437U" from Spectrum Colors, Minneapolis, Minn. (3%). This blend of dry pellets was loaded into the barrel of a 300-ton injection molding machine available from Van Dorn Plastic Machinery Company, Strongsville, Ohio. The first barrel temperature control zone was set at about 240° C., the second barrel temperature control zone was set at about 230° C., the third barrel temperature control zone was set at about 225° C., the nozzle temperature control was set at about 250° C., and the mold temperature control was set at about 75° C. The mold had provision for water-cooling in order to maintain the control temperature.

The previously-prepared bonded abrasive disc was placed into the mold and the molten thermoplastic blend injected into the mold via a center gate and onto and partially into the voids of one major surface of the abrasive disc. The extruder parameters were as follows: the injection time was about 2.5 seconds; the screw speed was about 300 rpm; the injection pressure was about 10.34 MPa; the injection velocity was about 7.6 cm/min; the shot size was about 40 grams; and the total cycle time was about 15 seconds.

The integral bonded abrasive/backing multi-layer abrasive disc was then removed from the mold. The article had a diameter of 17.8 cm., a center hole diameter of 2.2 cm., and a thickness of 6.35 mm.

Example 16

The bonded abrasive disc of Example 16 was prepared and evaluated as in Example 15 with the exception that the agglomerate abrasive was prepared from grade 80 aluminum oxide instead of grade 50 aluminum oxide.

Example 17

The multi-layer abrasive disc of Example 17 was prepared and evaluated in the same way as Example 15 with the exception that the agglomerate abrasive was prepared from grade P120 aluminum oxide instead of grade 50 aluminum oxide.

Example 18

The multi-layer abrasive disc of Example 18 was prepared and evaluated in the same way as Example 15 with the exception that the agglomerate abrasive was prepared from grade P180 aluminum oxide instead of grade 50 aluminum oxide.

Performance results for Examples 15-18 and are shown in Table 3.

TABLE 3

| Example | Cut, g/min | time, min. | % used | Initial Finish, $R_a$ | Final Finish, $R_a$ |
|---|---|---|---|---|---|
| 15 | 8.8 | 80 | 46 | 56 | 54 |
| 16 | 11.0 | 80 | 31 | 47 | 50 |
| 17 | 10.0 | 80 | 23 | 45 | 54 |
| 18 | 7.4 | 80 | 14 | 29 | 36 |

These data indicate the exceptional useful life of the articles of this invention. Also, the difference between initial and final finishes produced by the discs of this invention was very low (an $R_a$ difference of about 10 or more is visually perceptible), which indicates that the abrasive did not become dull even through 80 minutes of use.

Examples -20 and Comparative Examples D-E

Examples 19 and 20 and Comparative Examples D and E demonstrate the improvement in the abrasive compositions of this invention compared to compositions of U.S. Pat. No. 4,933,373. The wheels of these examples were evaluated by the procedure described in Example 1 with the exception that the wheel was rotated at 2000 rpm and the applied load was 44 kg. The wheels performed satisfactorily and deposited no smear onto the workpiece. The formulations are shown in Table 4, with test results shown in Table 5.

Example 19

An abrasive wheel was prepared in the same way as Example 1 with the exceptions that 300 g. of the polytetramethylene-oxide-di-aminobenzene POLAMINE 1000, 70 g. of the polyfunctional isocyanate PAPI 2020 and 1480 g. of the abrasive agglomerate were used. 1150 g. of the binder and abrasive mixture were replaced in the mold of Example 1 followed by curing of 30 minutes at 95° C. The resulting abrasive wheel had a density of 1.42 g/cc.

Comparative Example D

This abrasive wheel was made with a polyurethane elastomeric binder containing polybutadiene/peroxide crosslinked polymer. The wheel was similar to the formulation of Examples 9-13 of U.S. Pat. No. 4,933,373 (Moren) except for the abrasive particles used.

The wheel of Comparative Example D was prepared by first melting a polytetramethylene ether glycol ("POLYMEG 2000") until fluid in an oven heated to 50° C. Next, a polymerizable liquid mixture was formed by combining all ingredients listed in the Table 4 except the polymeric methylene diisocyanate ISONATE 143L. These components were well mixed and then a 4,4 diphenylmethane diisocyanate was added and dispersed throughout the mixture. To this reactive polymerizable mixture was added 896 g. agglomerate P120 aluminum oxide which was dispersed homogeneously throughout. The reactive resin/agglomerate mineral mix was then poured into a steel mold to produce a abrasive wheel with 203 mm outside diameter, 32 mm center hole, and thickness of 25 mm. The mold was closed and placed between the heated platens of a hydraulic press at 66° C. and under pressure of $8.9 \times 10^4$ N force for 30 minutes. The wheel was removed from the mold and postcure at 230° C. for 90 minutes in the oven. The resulting abrasive wheel had a density of 1.40 g/cc.

Example 20

The abrasive wheel was prepared and evaluated in the same way as Example 19. In this example the reactive ingredients were 414.18 grams of the polytetramethylene-oxide-di-aminobenzene (POLAMINE 1000) and 100.02 g. of the polymeric methylene diisocyanate (PAPI 2020.) The ingredients were thoroughly premixed, and then mixed with 1594 grams of 80 aluminum oxide abrasive particles. A 1658 g. portion of abrasive/binder mixture were cured in a mold of Example 1 at 120° C. for 30 minutes. The resulting abrasive wheel had a density of 2.0 g/cc.

Comparative Example E

This abrasive wheel was made with a polyurethane binder containing polybutadiene/peroxide crosslinked polymer. This formulation is similar to the formulation of Examples 14-15 of U.S. Pat. No. 4,933,373 (Moren.)

The wheel was prepared in the same way as of Comparative Example D. The polyol mix and polyisocyanate are shown in Table 4. To this reactive polymerizable mixture was added 1263.1 g. of 80 grade aluminum oxide abrasive (instead of agglomerate mineral) which were dispersed throughout in the resin batch. The wheel was cured at 66° C. for 30 minutes, removed from the mold, and further cured at 113° C. for 90 minutes. The resulting abrasive wheel had a density of 1.90 g/cc.

Example 21 and Comparative Example F

Example 21 and Comparative Example F demonstrated the advantages of the abrasive composition of this invention in the form of a bonded abrasive disc with an integral backing. The formulations are shown in Table 6. The resulting bonded integrally-backed abrasive discs were of dimensions 17.8 cm. O.D., 10.2 cm. abrasive I.D., 2.2 cm. backing I.D., and 5.5 mm. in overall thickness. The density of the abrasive component of the article in each case was 1.60 g/cc. As implied by these dimensions, the abrasive component of these examples was annular in shape as shown in FIG. 5. These examples were evaluated using the Steel Ring Grinding Test (Test Method 2). The test results are shown in Table 7.

Example 21

The bonded abrasive disc of Example 21 was prepared and evaluated in the same way as Example 1 5 with the exception that the agglomerate abrasive was prepared from P120 aluminum oxide instead of grade 50 aluminum oxide. A thermoplastic backing was injected directly onto this abrasive article by a injection molding process which is described in Example 15.

Comparative Example F

The polyurethane binder used in this bonded abrasive disc was similar to that used in Examples 14 and 15 in U.S. Pat. No. 4,933,373 (Moren) except for the abrasive particles used. All the liquid ingredients listed in the Table 6 were combined and mixed well except the polymeric methylene diisocyanate ISONATE 143L, which was mixed into the composition afterwards. 116 g. of agglomerate P120 grade mineral was added into this polymerizable mix and dispersed thoroughly. The resin-/agglomerate mineral mix was poured into a steel mold to produced an abrasive ring having 17.78 cm outside diameter, 10.16 cm center hold and thickness of 0.57 cm. After closing the mold was placed between the heated platens of a hydraulic press at 49° C. and under $8.9 \times 10^4$ N force for 30 minutes. The disc was removed from the mold and placed in oven at 113° C. for 90 minutes. A thermoplastic backing was applied to the abrasive ring by the injection molding process described in Example 15.

The test results of Example 19 and 20 show that wheels having polyurea binder matrices have significantly improved wear and efficiency characteristics when compared to Comparative Examples D and E where the matrix is the polyurethane containing polybutadiene/peroxide crosslinked binder which are described in the Example 9-15 of U.S. Pat. No. 4,933,373. The Example 19 and Control D showed that an abrasive wheel containing agglomerate mineral provides better cut than non-aggregate abrasive particles in Example 20 and Comparative Example E.

TABLE 4

| | Example 19 | | | Comparative D* | | | Example 20 | | | Comparative E** | | |
|---|---|---|---|---|---|---|---|---|---|---|---|---|
| Component | % Active Hydrogen | Wt % | Wt. g. | % Active Hydrogen | Wt % | Wt. g. | % Active Hydrogen | Wt % | Wt. g. | % Active Hydrogen | Wt. Wt % | g. |
| Papi 2020 | | 3.78 | 43.47 | | | | | 4.75 | 78.76 | | | |
| Polamine 1000 | 100 | 16.22 | 186.50 | | | | 100 | 19.65 | 325.8 | 10 | 2.88 | 48.96 |
| Polymeg 2000 | | | | 4 | 1.88 | 21.06 | | | | | | |
| Polybd R45HT | | | | 12 | 6.64 | 74.37 | | | | 18 | 10.21 | 173.37 |
| 1,4-butanediol | | | | 79 | 1.67 | 18.70 | | | | 67 | 1.45 | 24.68 |
| diamine (DETDA) | | | | 5 | 0.21 | 2.35 | | | | 5 | 0.21 | 3.64 |
| Isonate 143L | | | | | 7.36 | 82.43 | | | | | 7.62 | 129.45 |
| Trigonox 21OP50 | | | | | 0.44 | 4.93 | | | | | 0.90 | 15.22 |
| KR-55 | | | | | 0.18 | 2.02 | | | | | 0.34 | 5.71 |
| L-562 | | | | | 0.18 | 2.02 | | | | | 0.22 | 3.80 |
| butyl stearate | | | | | 1.42 | 15.90 | | | | | 1/42 | 15/90 |
| water | | | | | — | 0.20 | | | | | 0.02 | 0.29 |
| P120 Agglomerate | | 80 | 920 | | 80 | 896 | | | | | | |
| 80A alumina | | | | | | | | 75.61 | 1253.6 | | 74.36 | 1263.1 |

*Comparative Example D was made to closely resemble the composition of U.S. Pat. No. 4,933,373, Examples 9-13, except that the abrasive particles were agglomerated.
**Comparative Example E was made to closely resemble to composition of U.S. Pat. No. 4,933,373, Examples 14 and 15.

TABLE 5

| Example | Mineral/Resin Ratio | Cut, g/min | Wear, g/min | Efficiency cut/wear | Smear |
|---|---|---|---|---|---|
| 19 | 4.0 | 14.00 | 0.97 | 14.49 | no |
| Comp. Ex. D | 4.0 | 12.20 | 3.67 | 3.40 | no |
| 20 | 3.1 | 7.17 | 1.19 | 6.00 | no |
| Comp. Ex. E | 2.9 | 7.54 | 3.18 | 2.37 | no |

TABLE 6

| | Example 21 | | | Comparative Example F | | |
|---|---|---|---|---|---|---|
| Component | % Active Hydrogen | Wt. % | Wt. | % Active Hydrogen | Wt % | Wt. |
| Papi 2020 | | 3.10 | 4.65 | | | |
| Polamine 1000 | 100 | 13.43 | 20.10 | 10 | 2.53 | 3.79 |
| Polybd R45HT | | | | 18 | 8.97 | 13.45 |
| 1,4-butanediol | | | | 67 | 1.27 | 1.91 |
| diamine (DETDA) | | | | 5 | 0.19 | 0.28 |
| Isonate 143L | | | | | 6.57 | 9.85 |
| Trigonox 21OP50 | | | | | 0.78 | 1.17 |
| KR-55 | | | | | 0.10 | 0.21 |
| L-562 | | | | | 0.20 | 0.29 |
| Molecular Sieve 3A | | | | | 0.30 | 0.45 |
| butyl stearate | | | | | 1.17 | 1.75 |
| water | | | | | — | 0.01 |
| P120 Agglomerate | | | | | 97.86 | 116.79 |

TABLE 7

| Example | Cut, g/min | Time min. | % used | Initial Finish, Ra (μin) | Final Finish, Ra (μin) |
|---|---|---|---|---|---|
| 21 | 9.5 | 80 | 29 | 51 | 50 |
| Comp. F | 9.1 | 80 | 38 | 46 | 47 |

The test data demonstrate the superior wear resistance of the abrasive articles of this invention while maintaining good cut under a variety of workpiece attitudes. The efficiency (cut/wear) is much improved for the abrasive composition of this invention.

Various modifications and alterations of this invention will become appprarent to those skilled in the art without departing from the scope of this invention, and it should be understood that this invention is not to be unduly limited to the illustrated embodiments set forth herein.

What is claimed is:

1. A bonded abrasive composition comprising:
   a) a cured smear-resistant and wear-resistant elastomeric polyurea binder matrix having urea linkages, the binder matrix selected from the group consisting of;
      1) the reaction product of a first polyfunctional amine having an average functionality of 2 and an equivalent weight of at least about 300, said first polyfunctional amine being capable on polymerization of forming a first soft segment, and a polyfunctional isocyanate having an average isocyanate functionality of at least 2 and an equivalent weight of less than about 300, said poly functional isocyanate being capable on polymerization of forming a first hard segment; and
      2) the reaction product of a polyfunctional isocyanate prepolymer having a functionality of at least 2 and having an equivalent weight of at least about 300, said polyfunctional isocyanate prepolymer being capable on polymerization of forming a second soft segment, and a second polyfunctional amine having an average functionality of at least 2 and an equivalent weight of less than about 300, said second polyfunctional amine being capable on polymerization of forming a second hard segment; and,
   b) an effective amount of abrasive particles dispersed throughout said binder matrix.

2. A bonded abrasive composition in accordance with claim 1, said composition having no more than about 20 percent of said urea linkages substituted with urethane linkages.

3. A bonded abrasive composition in accordance with claim 1, wherein said first polyfunctional amine is an oligomeric aromatic polyfunctional amine having the formula:

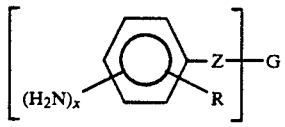

wherein n is an integer ranging from 2 to 4; each x is 1 or 2; each phenyl nucleus is para-amino, meta-amino, or di- meta-amino substituted; each Z is selected from the group consisting of

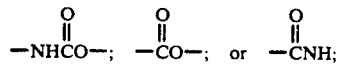

each R is hydrogen or lower alkyl of 4 carbon atoms or less; and G is an n-valent radical which may be obtained by the removal of hydroxyl or amino groups, respectively, from an n-valent polyol or polyamine having an equivalent weight ranging from about 300 to about 3000.

4. A bonded abrasive composition in accordance with claim 1 wherein said abrasive particles are preformed agglomerates of individual abrasive particles.

5. A bonded abrasive composition in accordance with claim 4 having sufficient void volume so that said composition has a density ranging from about 1.0 to about 3.0 g/cm$^3$.

6. In an abrasive-loaded device suitable for being removably mounted on a tool, the device having a shaped body of elastomeric material having dispersed therein an effective amount of abrasive particles, said shaped body being suitable for grinding, deburring, finishing and sanding, and having means for removably mounting said shaped body on a tool, the elastomeric material comprising a smear-resistant and wear-resistant elastomeric polyurea binder matrix having urea linkages, the binder matrix selected from the group consisting of:
   (1) the reaction product of a first polyfunctional amine having an average functionality of 2 and an equivalent weight of at least about 300, said first polyfunctional amine being capable on polymerization of forming a first soft segment, and a polyfunctional isocyanate having an average isocyanate functionality of at least 2 and an equivalent weight of less than about 300, said polyfunctional-isocyanate being capable of polymerization of forming a first segment, and
   (2) the reaction product of a polyfunctional isocyanate prepolymer having a functionality of at least 2 and having an equivalent weight of at least about 300, said polyfunctional isocyanate prepolymer being capable on polymerization of forming a second soft segment, and a second polyfunctional amine having an average functionality of at least 2 and an equivalent weight of less than about 300, said second polyfunctional amine being capable on polymerization of forming a second hard segment.

7. An abrasive-loaded device in accordance with claim 6, said binder matrix having no more than about 20 percent of said urea linkages substituted with urethane linkages.

8. An abrasive-loaded device in accordance with claim 6, said shaped body being in the form of a wheel.

9. An abrasive-loaded device in accordance with claim 6, said article including a backing material to which the shaped body is attached.

10. An abrasive-loaded device in accordance with claim 9, said backing comprising:
   (a) a tough, heat resistant, thermoplastic binder material; and
   (b) an effective amount of a fibrous reinforcing material distributed throughout the tough, heat resistant, thermoplastic binder material; wherein the tough, heat resistant, thermoplastic binder material and fibrous reinforcing material together comprise a hardened composition that will not substantially deform or disintegrate under abrading conditions.

11. The abrasive-loaded device of claim 10 wherein:
   (a) the tough, heat resistant, thermoplastic binder material has a melting point of at least 200° C.; and
   (b) the fibrous reinforcing material is in the form of individual fibers with a melting point at least 25° C. above the melting point of the tough, heat resistant, thermoplastic binder material.

12. The abrasive-loaded device of claim 10 wherein the tough, heat resistant, thermoplastic binder material is present in an amount of 60-99 wt-%, based upon the weight of the backing.

13. The abrasive-loaded device of claim 10 further including a molded-in attachment system.

14. The abrasive-loaded device of claim 13 wherein the backing is in the shape of a disc and the attachment system is located in the center of the disc.

15. The abrasive-loaded device of claim 10 wherein the back surface of the backing has ribs molded therein, the ribs being molded into the back surface of the backing in a radial pattern.

16. The abrasive-loaded device of claim 10 wherein the backing has an edge region and a center region; said edge region being of increased thickness relative to said center region.

17. A method of making the abrasive-loaded device of claim 10, the method comprising the steps of:
   (a) combining a tough, heat resistant, thermoplastic binder material and an effective amount of a fibrous reinforcing material such that the fibrous reinforcing material is distributed throughout the tough, heat resistant, thermoplastic binder, to form a softened, moldable, mixture;
   (b) applying the softened, moldable mixture to the shaped body; and
   (c) subjecting the softened, moldable mixture to conditions sufficient to harden the thermoplastic 18. Method in accordance with claim 17 wherein said applying step is achieved by injection molding.

19. A method of making a bonded abrasive composition, said method comprising the steps of:
   (a) combining the reaction precursors of a smear-resistant elastomeric polyurea binder matrix, the binder matrix selected from the group consisting of
   1) the reaction product of a first polyfunctional amine having an average functionality of 2 and an equivalent weight of at least about 300, said first polyfunctional amine being capable on polymerization of forming a first soft segment, and a polyfunctional isocyanate having an average isocyanate functionality of at least 2 and an equivalent weight of less than about 300, said polyfunctional isocyanate being capable on polymerization of forming a first hard segment; and
   2) the reaction product of a polyfunctional isocyanate prepolymer having a functionality of at least 2 and having an equivalent weight of at least about 300, said polyfunctional isocyanate prepolymer being capable on polymerization of forming a second soft segment, and a second polyfunctional amine having an average functionality of at least 2 and an equivalent weight of less than about 300, said second polyfunctional amine being capable on polymerization of forming a second hard segment;
   with an effective amount of abrasive particles to form a curable abrasive mixture; and
   (b) curing the mixture to form said bonded abrasive composition.

20. A method in accordance with claim 19 which further comprises introducing said curable abrasive mixture into a mold prior to curing the mixture to form said bonded abrasive composition.

21. A method in accordance with claim 19 wherein said first polyfunctional amine is an oligomeric aromatic polyfunctional amine having the formula:

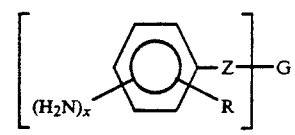

wherein n is an integer ranging from 2 to 4; each x is 1 or 2; each phenyl nucleus is para-amino, meta-amino, or di- meta-amino substituted; each Z is selected from the group consisting of

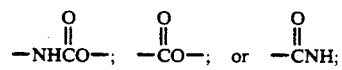

each R is hydrogen or lower alkyl of 4 carbon atoms or less; and G is an n-valent radical which may be obtained by the removal of hydroxyl or amino groups, respectively, from an n-valent polyol or polyamine having an equivalent weight ranging from about 300 to about 3000.

22. An abrasive article comprising:
   (A) a bonded abrasive composition comprising:
      1) a cured smear-resistant and wear-resistant elastomeric polyurea binder matrix having urea linkages, the binder matrix selected from the group consisting of;
         a) the reaction product of a first polyfunctional amine having an average functionality of 2 and an equivalent weight of at least about 300, said first polyfunctional amine being capable on polymerization of forming a first soft segment, and a polyfunctional isocyanate having an average isocyanate functionality of at least 2 and an equivalent weight of less than about 300, said poly functional isocyanate being capable on polymerization of forming a first hard segment; and
         b) the reaction product of a polyfunctional isocyanate prepolymer having a functionality of at least 2 and having an equivalent weight of at least about 300, said polyfunctional isocyanate prepolymer being capable on polymerization of forming a second soft segment, and a second polyfunctional amine having an average functionality of at least 2 and an equivalent weight of less than about 300, said second polyfunctional amine being capable on polymerization of forming a second hard segment; and,
      2) an effective amount of abrasive particles dispersed throughout said binder matrix,
   said composition integrally molded to a backing comprising
   B) a tough, heat resistant, thermoplastic binder material and an effective amount of a fibrous reinforcing material distributed throughout the tough, heat resistant, thermoplastic binder material; wherein the tough, heat resistant, thermoplastic binder material and fibrous reinforcing material together comprise a hardened composition that will not substantially deform or disintegrate under abrading conditions.

* * * * *